(12) United States Patent
Knoppert et al.

(10) Patent No.: US 10,996,718 B2
(45) Date of Patent: May 4, 2021

(54) FOLDABLE CASE FOR A MULTI-FORM FACTOR INFORMATION HANDLING SYSTEM (IHS) WITH A DETACHABLE KEYBOARD

(71) Applicant: Dell Products, L.P., Round Rock, TX (US)

(72) Inventors: Michiel Sebastiaan Emanuel Petrus Knoppert, Amsterdam (NL); Mark R. Ligameri, Santa Rosa, FL (US)

(73) Assignee: Dell Products, L.P., Round Rock, TX (US)

( * ) Notice: Subject to any disclaimer, the term of this patent is extended or adjusted under 35 U.S.C. 154(b) by 29 days.

(21) Appl. No.: 16/374,510

(22) Filed: Apr. 3, 2019

(65) Prior Publication Data

US 2020/0319679 A1 Oct. 8, 2020

(51) Int. Cl.
*G06F 1/16* (2006.01)

(52) U.S. Cl.
CPC .......... *G06F 1/1669* (2013.01); *G06F 1/1641* (2013.01); *G06F 1/1618* (2013.01)

(58) Field of Classification Search
CPC .... G06F 1/1669; G06F 1/1641; G06F 1/1618; G06F 1/1632
See application file for complete search history.

(56) References Cited

U.S. PATENT DOCUMENTS

| | | | |
|---|---|---|---|
| 5,739,810 A | 4/1998 | Merkel | |
| 5,847,698 A | 12/1998 | Reavey et al. | |
| 6,431,936 B1 | 8/2002 | Kiribuchi | |
| 6,510,048 B2 | 1/2003 | Rubenson et al. | |
| 6,700,773 B1 | 3/2004 | Adriaansen et al. | |
| 6,922,333 B2 | 7/2005 | Weng et al. | |
| 7,061,472 B1 | 7/2006 | Schweizer et al. | |
| 7,551,428 B2 | 7/2009 | Homer et al. | |
| 7,663,602 B2 | 2/2010 | Jones et al. | |
| 7,990,702 B2 | 8/2011 | Tracy et al. | |
| 7,991,442 B2 | 8/2011 | Kim | |
| 8,310,823 B2 | 11/2012 | Stoltz | |
| 8,331,098 B2 | 12/2012 | Leung | |

(Continued)

FOREIGN PATENT DOCUMENTS

| | | |
|---|---|---|
| CN | 201945921 U | 8/2011 |
| CN | 204146519 U | 2/2015 |

OTHER PUBLICATIONS

Binary Fortress Software, "Precise Monitor Controls," 2017-2018, 2 pages, retrieved Oct. 15, 2018, available at https://www.displayfusion.com/Features/MonitorConfig/.

(Continued)

*Primary Examiner* — James Wu
*Assistant Examiner* — Christopher L Augustin
(74) *Attorney, Agent, or Firm* — Fogarty LLP

(57) ABSTRACT

Embodiments of a foldable case for a multi-form factor IHS with a detachable keyboard are described. In some embodiments, a folio case may include: a first panel comprising a left-side magnet and a right-side magnet; a second panel comprising a left-side magnet and a right-side magnet, where a top edge of the second panel is coupled to a bottom edge of the first panel; and a third panel comprising a left-side magnet and a right-side magnet, where a top edge of the third panel is coupled to a bottom edge of the second panel.

11 Claims, 18 Drawing Sheets

(56) References Cited

U.S. PATENT DOCUMENTS

| | | | |
|---|---|---|---|
| 8,803,816 B2 | 8/2014 | Kilpatrick, II et al. | |
| 8,988,876 B2 | 3/2015 | Corbin et al. | |
| 9,268,518 B2* | 2/2016 | Reeves | G09G 5/14 |
| 9,489,054 B1* | 11/2016 | Sumsion | G06F 1/1681 |
| 9,684,342 B2 | 6/2017 | Kim et al. | |
| 9,740,237 B2 | 8/2017 | Moore et al. | |
| 9,778,702 B2* | 10/2017 | Song | G06F 1/1667 |
| 9,874,908 B2 | 1/2018 | Han et al. | |
| 9,946,295 B2* | 4/2018 | Smith | G06F 1/1669 |
| 10,082,840 B2* | 9/2018 | Esmaeili | G06F 1/1684 |
| 10,281,952 B2* | 5/2019 | Li | A45C 13/005 |
| 2004/0001049 A1 | 1/2004 | Oakley | |
| 2006/0183505 A1 | 8/2006 | Willrich | |
| 2009/0244016 A1 | 10/2009 | Casparian et al. | |
| 2009/0316355 A1 | 12/2009 | Jones | |
| 2010/0238620 A1 | 9/2010 | Fish | |
| 2010/0321275 A1 | 12/2010 | Hinckley et al. | |
| 2012/0069503 A1 | 3/2012 | Lauder et al. | |
| 2012/0293953 A1* | 11/2012 | Wu | F16M 11/10 361/679.56 |
| 2013/0076614 A1* | 3/2013 | Ive | G06F 1/1632 345/156 |
| 2014/0246340 A1* | 9/2014 | Jiang | A45C 11/00 206/45.23 |
| 2014/0284228 A1* | 9/2014 | Chiou | G06F 1/1626 206/45.23 |
| 2015/0103014 A1 | 4/2015 | Kim et al. | |
| 2015/0141092 A1* | 5/2015 | Murauyou | G06F 1/166 455/575.8 |
| 2015/0151887 A1* | 6/2015 | Huang | A45C 11/00 224/191 |
| 2015/0198978 A1* | 7/2015 | Catchpole | G06F 1/1632 345/173 |
| 2015/0316999 A1* | 11/2015 | Harms | G06F 3/023 345/169 |
| 2015/0365123 A1* | 12/2015 | Kim | H04B 1/3888 455/575.8 |
| 2016/0291639 A1* | 10/2016 | Laine | G06F 1/1626 |
| 2017/0054467 A1* | 2/2017 | Miyazawa | G06F 1/1632 |
| 2017/0069299 A1 | 3/2017 | Kwak et al. | |
| 2017/0180838 A1 | 6/2017 | Hemesath et al. | |
| 2017/0255320 A1 | 9/2017 | Kumar et al. | |
| 2017/0344120 A1 | 11/2017 | Zuniga et al. | |
| 2018/0088632 A1 | 3/2018 | Dreessen et al. | |
| 2018/0121012 A1 | 5/2018 | Asrani | |
| 2018/0129391 A1 | 5/2018 | Files et al. | |
| 2018/0188774 A1 | 7/2018 | Ent et al. | |
| 2018/0232010 A1 | 8/2018 | Kummer et al. | |
| 2018/0239396 A1* | 8/2018 | Lu | G06F 3/0202 |

OTHER PUBLICATIONS

Microsoft, "ChangeDisplaySettingsExA function," 7 pages, retrieved Oct. 15, 2018, available at https://msdn.microsoft.com/en-us/library/dd183413(v=vs.85).aspx VS. https://docs.microsoft.com/en-us/windows/desktop/api/winuser/nf-winuser-changedisplaysettingsexa.

Microsoft, "SendKeys.Send(String) Method," 6 pages, retrieved Oct. 11, 2018, available at https://msdn.microsoft.com/en-us/library/system.windows.forms.sendkeys.send(v=vs.110).aspx.

Microsoft, "DoDragDrop function," 4 pages, retrieved Oct. 11, 2018, available at https://msdn.microsoft.com/en-us/library/windows/desktop/ms678486(v=vs.85).aspx.

Microsoft, "System Events and Mouse Messages," published May 30, 2018, 4 pages, retrieved Oct. 11, 2018, available at https://msdn.microsoft.com/en-us/library/windows/desktop/ms703320(v=vs.85).aspx.

Microsoft, "InkSystemGesture Enumeration," 3 pages, retrieved Oct. 11, 2018, available at https://docs.microsoft.com/en-us/library/windows/desktop/ms695579(v=vs.85).aspx.

Microsoft, "GetWindowRect function," 3 pages, retrieved Oct. 11, 2018, available at https://msdn.microsoft.com/en-us/library/windows/desktop/ms633519(v=vs.85).aspx.

Microsoft, "PointerRoutedEventArgs Class," 9 pages, retrieved Oct. 11, 2018, available at https://docs.microsoft.com/en-us/uwp/api/Windows.UI.Xaml.Input.PointerRoutedEventArgs#Windows_UI_Xaml_Input_PointerRoutedEventArgs_GetCurrentPoint_Windows_UI_Xaml_UIElement_.

Microsoft, "SetWindowPos function," 7 pages, retrieved Oct. 11, 2018, available at https://msdn.microsoft.com/en-us/library/windows/desktop/ms633545(v=vs.85).aspx.

Microsoft, "Time Functions," published May 30, 2018, 5 pages, retrieved Oct. 11, 2018, available at https://msdn.microsoft.com/en-us/library/windows/desktop/ms725473(v=vs.85).aspx.

Microsoft, "How Do I Detect a Window Open Event," 11 pages, retrieved Oct. 15, 2018, available at https://social.msdn.microsoft.com/Forums/vstudio/en-US/1953f400-6f1c-49e0-a63e-d724bccc7676/how-do-i-detect-a-window-open-event?forum=csharpgeneral.

Microsoft, "How Do I Maximize/Minimize Applications Programmatically in C#?," 2 pages, retrieved Oct. 15, 2018, available at https://social.msdn.microsoft.com/Forums/vstudio/en-US/9bde4870-1599-4958-9ab4-902fa98ba53a/how-do-i-maximizeminimize-applications-programmatically-in-c?forum=csharpgeneral.

Microsoft, "WinMain Entry Point," 7 pages, retrieved Oct. 15, 2018, available at https://msdn.microsoft.com/en-us/library/ms633559(vs.85).aspx.

Stack Overflow, "How Can I Split a Window in Two in Windows API," 6 pages, retrieved Oct. 15, 2018, available at https://stackoverflow.com/questions/10467112/how-can-i-split-a-window-in-two-in-windows-api.

Microsoft, "Application User Model IDs (AppUserModelIDs)," published May 30, 2018, 8 pages, retrieved Oct. 15, 2018, available at https://docs.microsoft.com/en-us/windows/desktop/shell/appids.

Microsoft, "Mouse Events in Windows Forms," published Mar. 29, 2017, 6 pages, retrieved Oct. 15, 2018, available at https://docs.microsoft.com/en-us/dotnet/framework/winforms/mouse-events-in-windows-forms.

International Search Authority (ISA), "International Search Report," International Application No. PCT/US2020/24962, dated Aug. 3, 2020, 4 pages, publisher Commissioner for Patents—PCT, Alexandria, Virginia, United States of America.

International Search Authority (ISA), "Written Opinion of the International Searching Authority," International Application No. PCT/US2020/24962, dated Aug. 3, 2020, 6 pages, publisher Commissioner for Patents PCT, Alexandria, Virginia, United States of America.

* cited by examiner

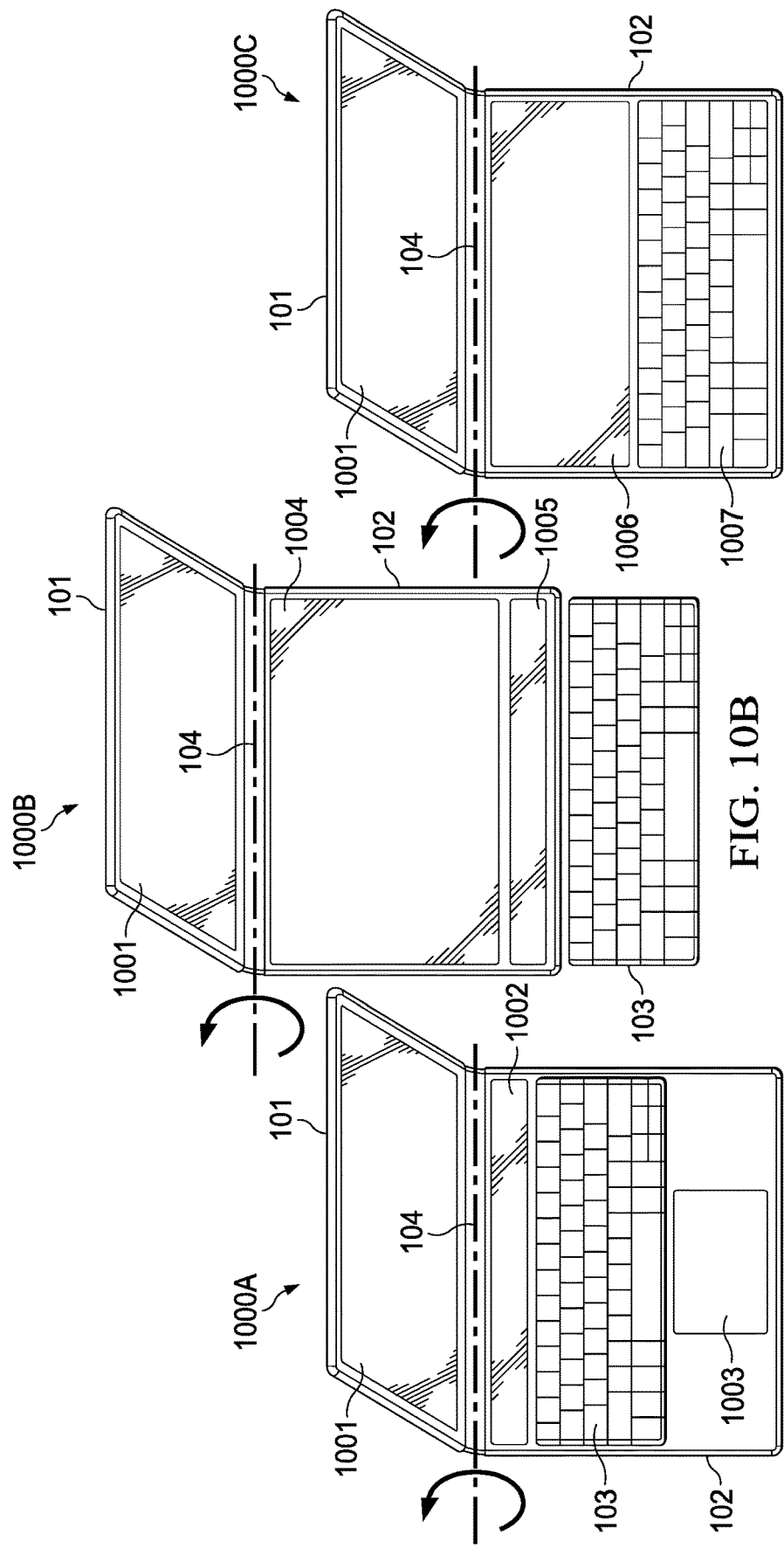

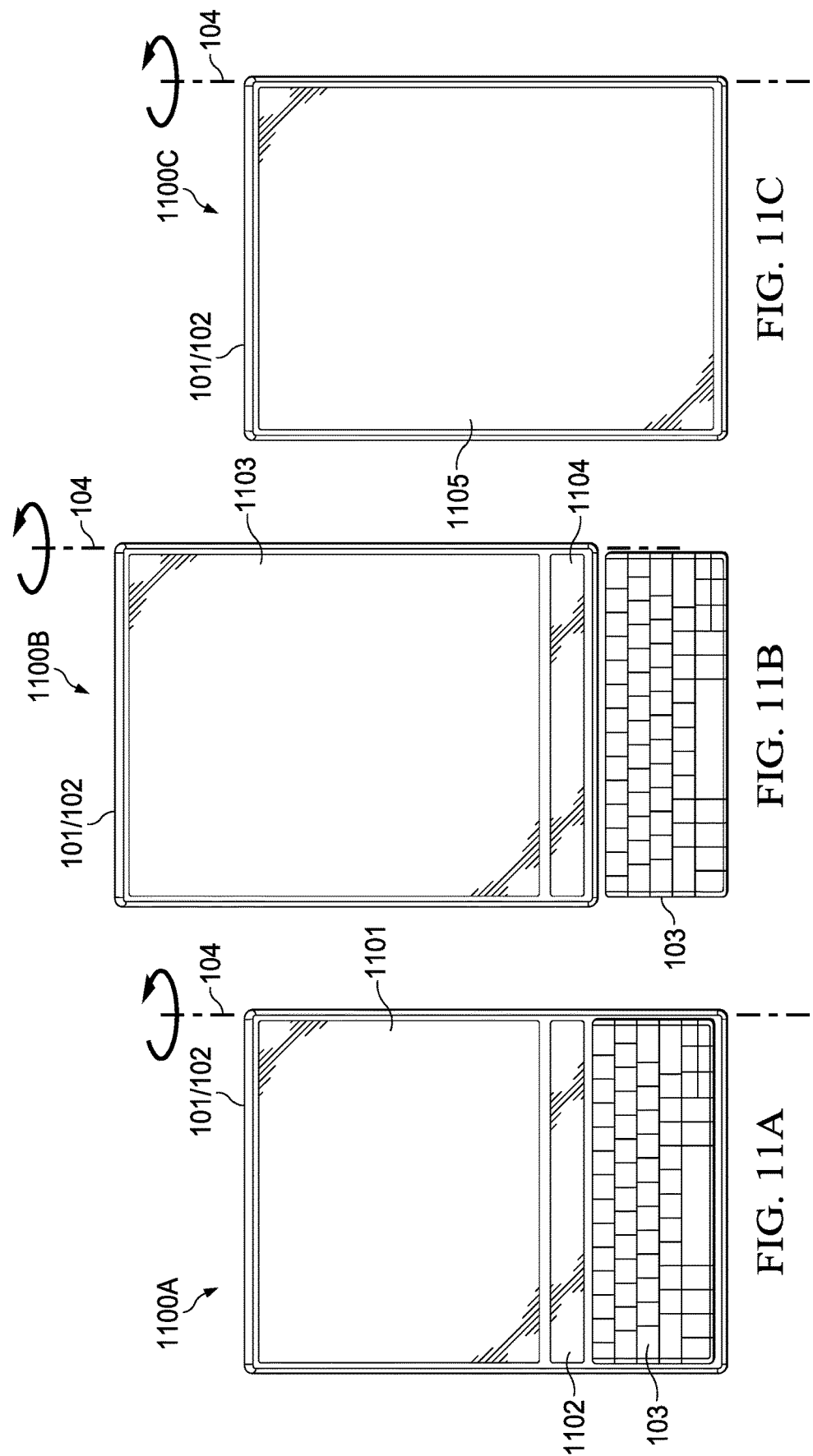

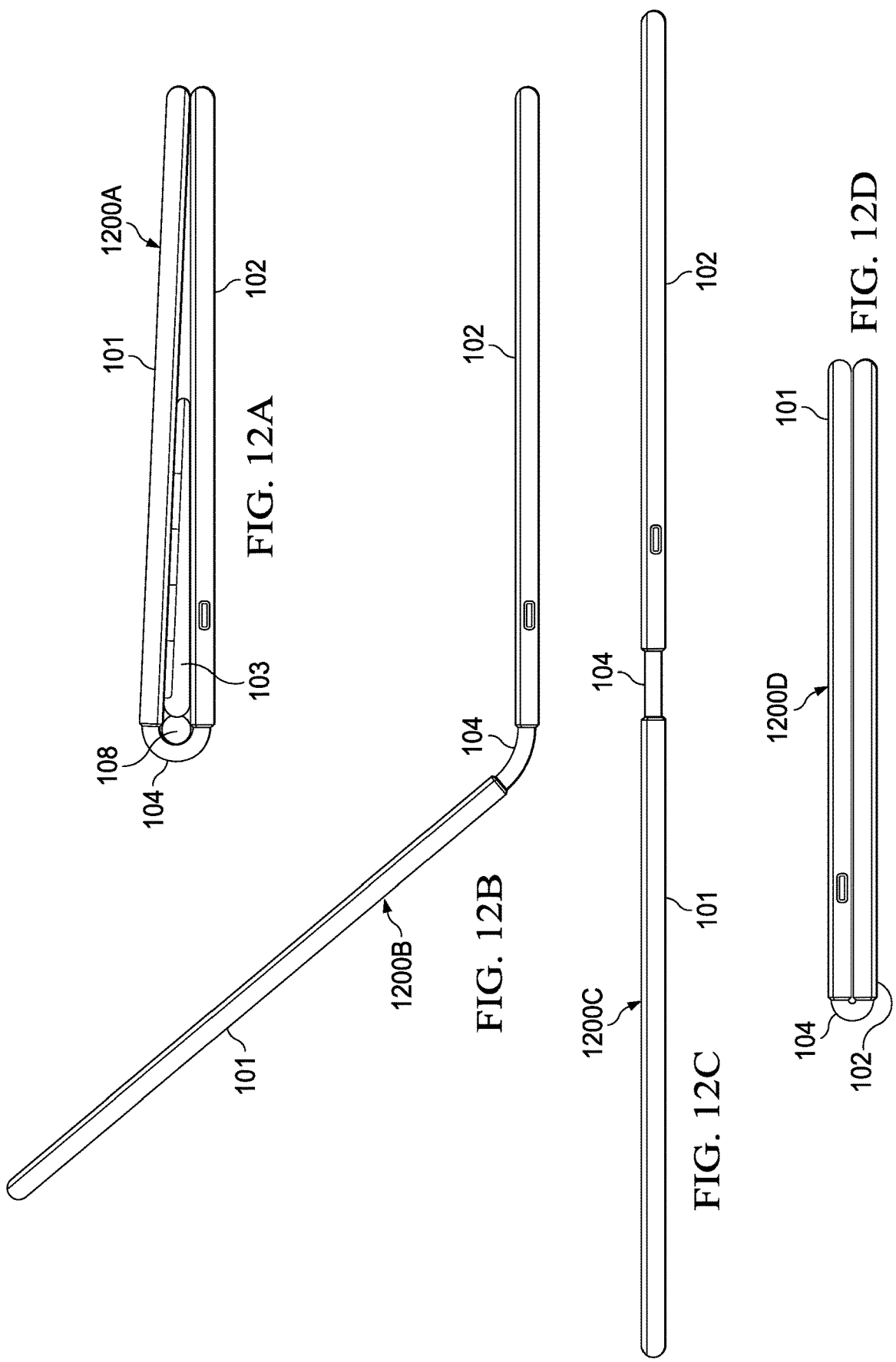

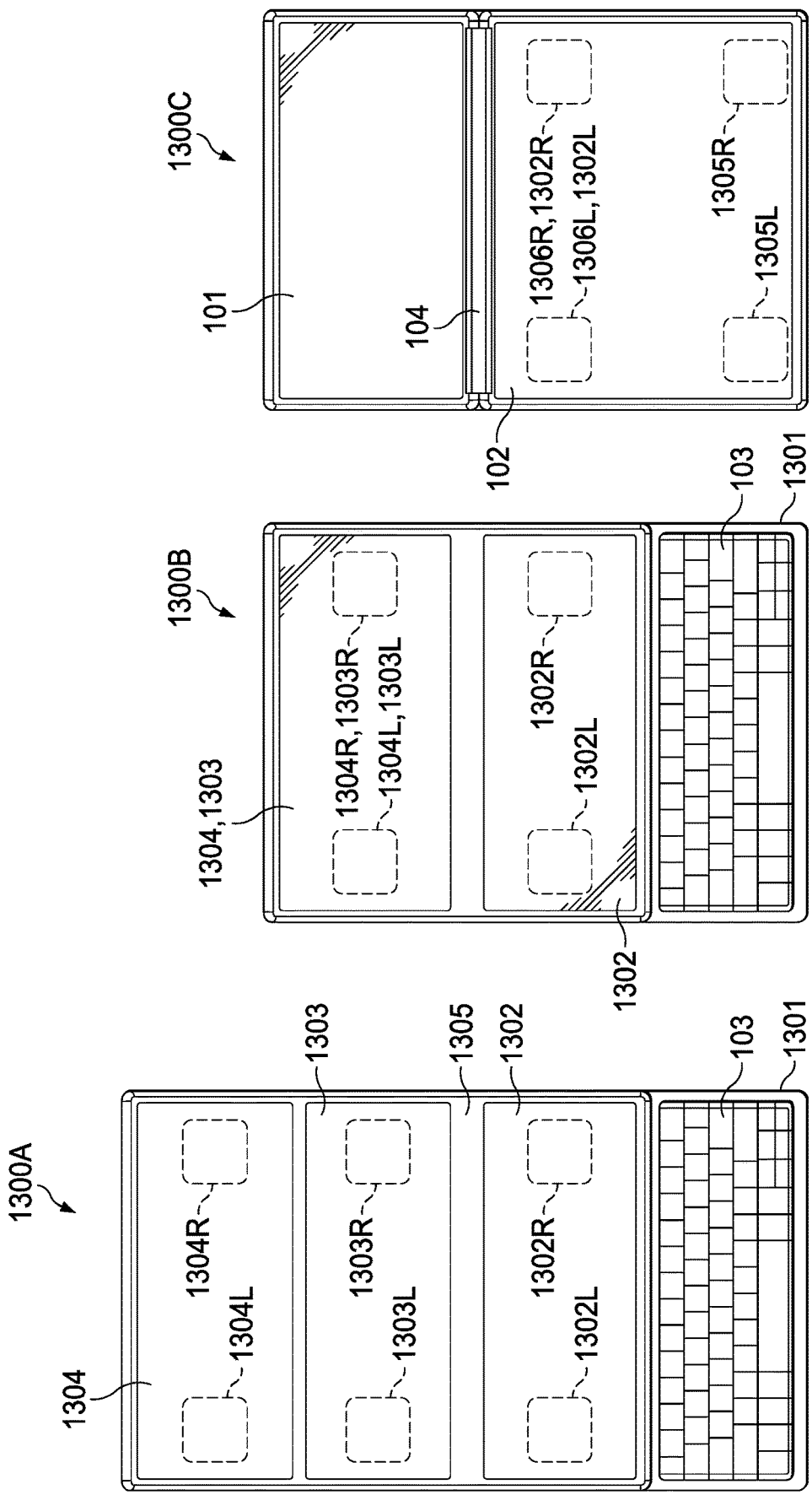

FOLDABLE CASE FOR A MULTI-FORM FACTOR INFORMATION HANDLING SYSTEM (IHS) WITH A DETACHABLE KEYBOARD

FIELD

This disclosure relates generally to Information Handling Systems (IHSs), and more specifically, to a foldable case for a multi-form factor IHS with a detachable keyboard.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Nowadays, users can choose among many different types of mobile IHS devices. Each type of device (e.g., tablets, 2-in-1s, mobile workstations, notebooks, netbooks, ultrabooks, etc.) has unique portability, performance, and usability features; however, each also has its own trade-offs and limitations. For example, tablets have less compute power than notebooks and workstations, while notebooks and workstations lack the portability of tablets. A conventional 2-in-1 device combines the portability of a tablet with the performance of a notebook, but with a small display—an uncomfortable form factor in many use-cases.

The inventors hereof have determined that, as productivity continues to be a core tenet of modern computing, mobile IHS devices should provide versatility for many use-cases and display postures in use today (e.g., tablet mode, laptop mode, etc.), as well as future display postures (e.g., digital notebooks, new work surfaces, etc.). Additionally, mobile IHS devices should provide larger display area with reduced size and weight.

SUMMARY

Embodiments of a foldable case for a multi-form factor Information Handling System (IHS) with a detachable keyboard are described. In an illustrative, non-limiting embodiment, a folio case may include a first panel comprising a left-side magnet and a right-side magnet; a second panel comprising a left-side magnet and a right-side magnet, where a top edge of the second panel is coupled to a bottom edge of the first panel; and a third panel comprising a left-side magnet and a right-side magnet, where a top edge of the third panel is coupled to a bottom edge of the second panel.

In response to the first panel being folded over the second panel, the left-side magnet of the first panel may be magnetically coupled to the left-side magnet of the second panel, and the right-side magnet of the first panel may be magnetically coupled to the right-side magnet of the second panel. The third panel may have a thickness equal to the thickness of the first and second panels folded over each other. A space between the top edge of the third panel and the bottom edge of the second panel may be larger than a space between the top edge of the second panel and the bottom edge of the first panel. The space between the bottom edge of the second panel and the top edge of the third panel accommodates the hinge of an IHS. The third panel may be configured to receive a keyboard usable with the IHS.

The top edge of the keyboard may include one or more magnets configured to couple the keyboard to the bottom edge of the third panel, and to mate an electrical terminal of the keyboard against an electrical terminal of the third panel. In a first configuration, the first panel may be folded over the second panel to form a panel stack, where the keyboard is coupled to the third panel, and a display of the IHS sits on top of the third panel and the keyboard. In a second configuration, the display of the IHS may slide over the panel stack and the third panel to reveal the keyboard.

In another illustrative, non-limiting embodiment, a keyboard may include a plurality of keys; and a magnet disposed alongside a top edge of the keyboard, where the magnet is configured to couple the keyboard to a folio case. The folio case may include a first panel comprising a left-side magnet and a right-side magnet; a second panel comprising a left-side magnet and a right-side magnet, where a top edge of the second panel is coupled to a bottom edge of the first panel; and a third panel comprising a left-side magnet and a right-side magnet, where a top edge of the third panel is coupled to a bottom edge of the second panel.

In a first configuration, the keyboard may be removably coupled to a bottom edge of the third panel, and a display of an IHS may rest above the third panel and the keyboard. In a second configuration, the display may rest above (i) the first panel folded over the second panel, and (ii) the third panel. In a third configuration, the keyboard may be removed from the third panel. The top edge of the keyboard may be configured to be coupled directly to an edge of a display of an IHS using the magnet.

In yet another illustrative, non-limiting embodiment, a method may include folding a first panel of a folio case over a second panel of the folio case to form a stack; and sliding an IHS from (i) a first position where a first portion of a display rests over a third panel of the folio case to (ii) a second position where the first portion of the display rests over the stack and a second portion of the display rests of the third panel. In the first position, the second portion of the display may rest over a keyboard coupled to the third panel.

The method may include tearing the keyboard off from the third panel while the IHS is in the second position. The method may also include coupling a top edge of the keyboard to a bottom edge of the third panel while the IHS is in the second position. The method may further include: sliding the IHS from the second position to the first position; and unfolding the first panel from the second panel to cover another display of the IHS, where the other display is coupled to the display via a hinge.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

FIGS. 10A-C and 11A-C illustrate various use-cases, according to some embodiments.

FIGS. 12A-D illustrate a hinge implementation, according to some embodiments.

FIGS. 13A-E illustrate a folio system with a detachable keyboard in various configurations, according to some embodiments.

DETAILED DESCRIPTION

Embodiments described herein provide a multi-form factor Information Handling System (IHS) with an attachable keyboard. In various implementations, a mobile IHS device may include a dual-display, foldable IHS. Each display may include, for example, a Liquid Crystal Display (LCD), Organic Light-Emitting Diode (OLED), or Active Matrix OLED (AMOLED) panel or film, equipped with a touchscreen configured to receive touch inputs. The dual-display, foldable IHS may be configured by a user in any of a number of display postures, including, but not limited to: laptop, tablet, book, clipboard, stand, tent, and/or display.

A user may operate the dual-display, foldable IHS in various modes using a virtual, On-Screen Keyboard (OSK), or a removable, physical keyboard. In some use cases, a physical keyboard may be placed atop at least one of the screens to enable use of the IHS as a laptop, with additional User Interface (UI) features (e.g., virtual keys, touch input areas, etc.) made available via the underlying display, around the keyboard. In other use cases, the physical keyboard may be placed in front of the IHS to expose a larger display area. The user may also rotate the dual-display, foldable IHS, to further enable different modalities with the use of the physical keyboard. In some cases, when not in use, the physical keyboard may be placed or stored inside the dual-display, foldable IHS.

Figure 1:
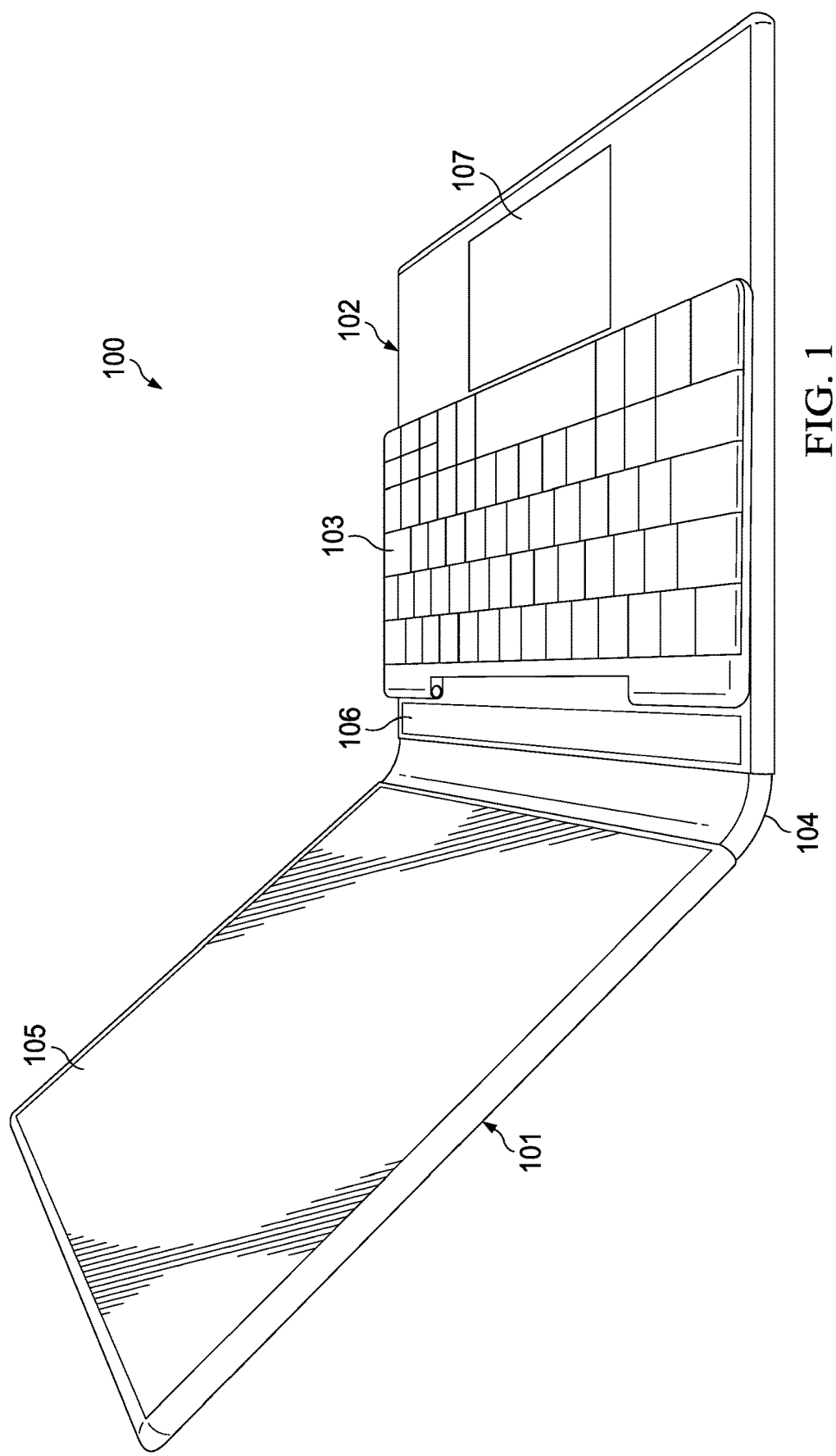
FIG. 1 is a perspective view of a multi-form factor Information Handling System (IHS) with a removable keyboard, according to some embodiments.

FIG. 1 is a perspective view of multi-form factor Information Handling System (IHS) 100 with removable keyboard 103. As shown, first display 101 is coupled to second display 102 via hinge 104, and keyboard 103 sits atop second display 102. The current physical arrangement of first display 101 and second display 102 creates a laptop posture, such that first display 101 becomes primary display area 105 presented by IHS 100, where video or display frames may be rendered for viewing by a user.

In operation, in this particular laptop posture, second display 102 may sit horizontally on a work surface with its display surface facing up, and keyboard 103 may be positioned on top of second display 102, occluding a part of its display surface. In response to this posture and keyboard position, IHS 100 may dynamically produce a first UI feature in the form of at least one configurable secondary display area 106 (a "ribbon area" or "touch bar"), and/or a second UI feature in the form of at least one configurable touch input area 107 (a "virtual trackpad"), using the touchscreen of second display 102.

To identify a current posture of IHS 100 and a current physical relationship or spacial arrangement (e.g., distance, position, speed, etc.) between display(s) 101/102 and keyboard 103, IHS 100 may be configured to use one or more sensors disposed in first display 101, second display 102, keyboard 103, and/or hinge 104. Based upon readings from these various sensors, IHS 100 may then select, configure, modify, and/or provide (e.g., content, size, position, etc.) one or more UI features.

In various embodiments, displays 101 and 102 may be coupled to each other via hinge 104 to thereby assume a plurality of different postures, including, but not limited, to: laptop, tablet, book, or display.

When display 102 is disposed horizontally in laptop posture, keyboard 103 may be placed on top of display 102, thus resulting in a first set of UI features (e.g., ribbon area or touch bar 106, and/or touchpad 107). Otherwise, with IHS 100 still in the laptop posture, keyboard 103 may be placed next to display 102, resulting in a second set of UI features.

As used herein, the term "ribbon area" or "touch bar" 106 refers to a dynamic horizontal or vertical strip of selectable and/or scrollable items, which may be dynamically selected for display and/or IHS control depending upon a present context, use-case, or application. For example, when IHS 100 is executing a web browser, ribbon area or touch bar 106 may show navigation controls and favorite websites. Then, when IHS 100 operates a mail application, ribbon area or touch bar 106 may display mail actions, such as replying or flagging. In some cases, at least a portion of ribbon area or touch bar 106 may be provided in the form of a stationary control strip, providing access to system features such as brightness and volume. Additionally, or alternatively, ribbon area or touch bar 106 may enable multitouch, to support two or more simultaneous inputs.

In some cases, ribbon area 106 may change position, location, or size if keyboard 103 is moved alongside a lateral or short edge of second display 102 (e.g., from horizontally displayed alongside a long side of keyboard 103 to being vertically displayed alongside a short side of keyboard 103). Also, the entire display surface of display 102 may show rendered video frames if keyboard 103 is moved alongside the bottom or long edge of display 102. Conversely, if keyboard 103 is removed of turned off, yet another set of UI features, such as an OSK, may be provided via display(s) 101/102. As such, in many embodiments, the distance and/or relative position between keyboard 103 and display(s) 101/102 may be used to control various aspects the UI.

During operation, the user may open, close, flip, swivel, or rotate either of displays 101 and/or 102, via hinge 104, to produce different postures. In each posture, a different arrangement between IHS 100 and keyboard 103 results in different UI features being presented or made available to the user. For example, when second display 102 is folded against display 101 so that the two displays have their backs against each other, IHS 100 may be said to have assumed a tablet posture (e.g., FIG. 7G) or book posture (e.g., FIG. 8D), depending upon whether IHS 100 is stationary, moving, horizontal, resting at a different angle, and/or its orientation (landscape vs. portrait).

In many of these scenarios, placement of keyboard 103 upon or near display(s) 101/102, and subsequent movement or removal, may result in a different set of UI features than when IHS 100 is in laptop posture.

In many implementations, different types of hinges 104 may be used to achieve and maintain different display postures, and to support different keyboard arrangements. Examples of suitable hinges 104 include, but are not limited to, the 360-hinge shown in FIGS. 12A-D). Hinge 104 may include wells or compartments for docking, cradling, charging, or storing accessories. Moreover, one or more aspects of hinge 104 may be monitored via one or more sensors (e.g., to determine whether an accessory is charging) when controlling the different UI features.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 2:
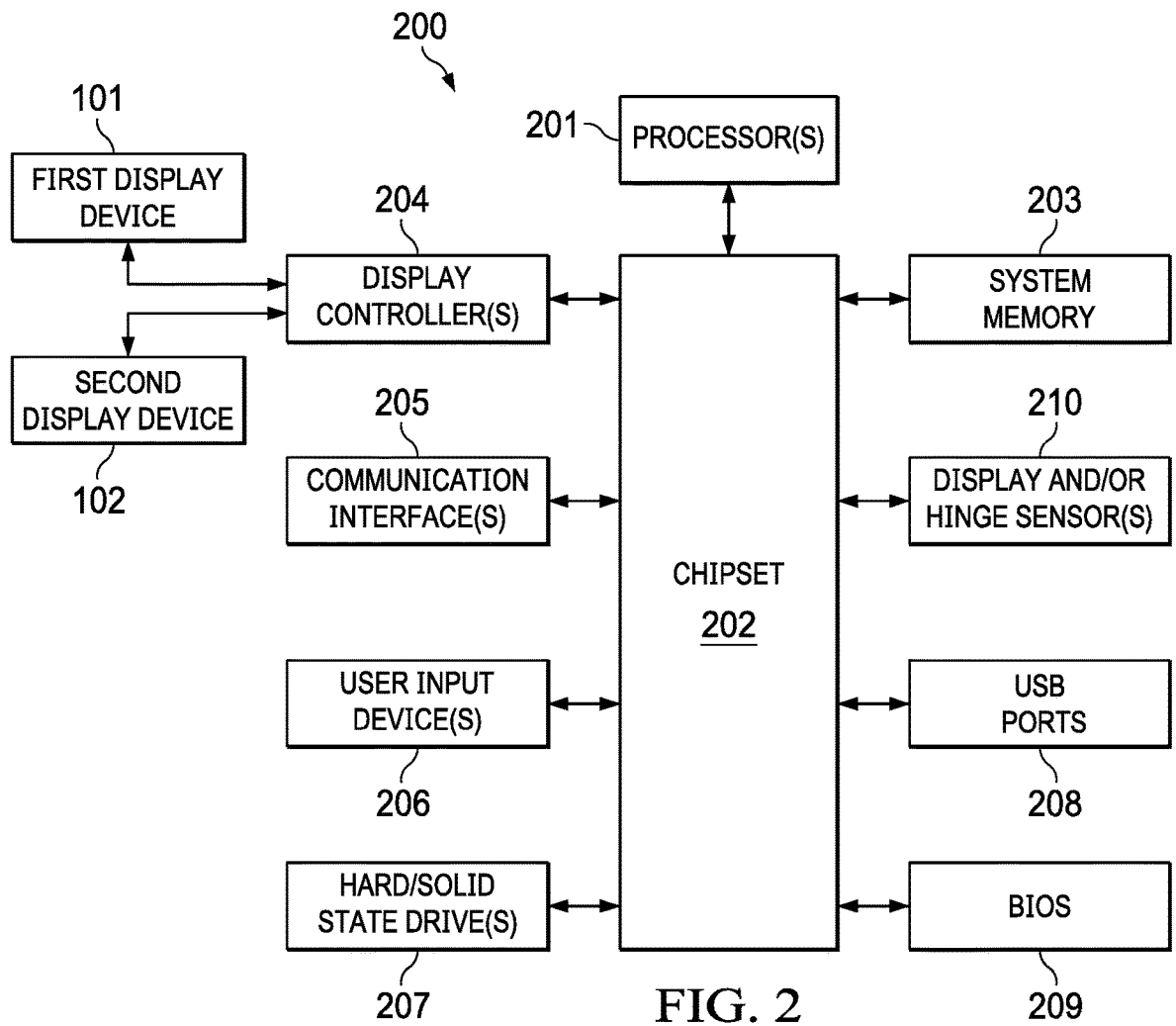
FIGS. 2 and 3 are block diagrams of components of the multi-form factor IHS and removable keyboard, respectively, according to some embodiments.

FIG. 2 is a block diagram of components 200 of multi-form factor IHS 100. As depicted, components 200 include processor 201. In various embodiments, IHS 100 may be a single-processor system, or a multi-processor system including two or more processors. Processor 201 may include any processor capable of executing program instructions, such as a PENTIUM series processor, or any general-purpose or embedded processors implementing any of a variety of Instruction Set Architectures (ISAs), such as an x86 ISA or a Reduced Instruction Set Computer (RISC) ISA (e.g., POWERPC, ARM, SPARC, MIPS, etc.).

IHS 100 includes chipset 202 coupled to processor 201. In certain embodiments, chipset 202 may utilize a QuickPath Interconnect (QPI) bus to communicate with processor 201. In various embodiments, chipset 202 may provide processor 201 with access to a number of resources. Moreover, chipset 202 may be coupled to communication interface(s) 205 to enable communications via various wired and/or wireless networks, such as Ethernet, WiFi, BLUETOOTH, cellular or mobile networks (e.g., CDMA, TDMA, LTE, etc.), satellite networks, or the like. For example, communication interface(s) 205 may be coupled to chipset 202 via a PCIe bus.

Chipset 202 may be coupled to display controller(s) 204, which may include one or more or graphics processor(s) (GPUs) on a graphics bus, such as an Accelerated Graphics Port (AGP) or Peripheral Component Interconnect Express (PCIe) bus. As shown, display controller(s) 204 provide video or display signals to first display device 101 and second display device 202. In other implementations, any number of display controller(s) 204 and/or display devices 101/102 may be used.

Each of display devices 101 and 102 may include a flexible display that is deformable (e.g., bent, folded, rolled, or stretched) by an external force applied thereto. For example, display devices 101 and 102 may include LCD, OLED, or AMOLED, plasma, electrophoretic, or electrowetting panel(s) or film(s). Each display device 101 and 102 may include a plurality of pixels arranged in a matrix, configured to display visual information, such as text, two-dimensional images, video, three-dimensional images, etc.

Display device(s) 101/102 may be configured to sense haptic and/or physical touch events, and to generate touch information. To this end, display device(s) 101/102 may include a touchscreen matrix (e.g., a layered capacitive panel or the like) and/or touch controller configured to receive and interpret multi-touch gestures from a user touching the screen with a stylus or one or more fingers. In some cases, display and touch control aspects of display device(s) 101/102 may be collectively operated and controlled by display controller(s) 204.

In some cases, display device(s) 101/102 may also comprise a deformation or bending sensor configured to generate deformation or bending information including, but not limited to: the bending position of a display (e.g., in the form of a "bending line" connecting two or more positions at which bending is detected on the display), bending direction, bending angle, bending speed, etc. In these implementations, display device(s) 101/102 may be provided as a single continuous display, rather than two discrete displays.

Chipset 202 may also provide processor 201 and/or display controller(s) 204 with access to memory 203. In various embodiments, system memory 203 may be implemented using any suitable memory technology, such as static RAM (SRAM), dynamic RAM (DRAM) or magnetic disks, or any nonvolatile/Flash-type memory, such as a solid-state drive (SSD) or the like. Memory 203 may store program instructions that, upon execution by processor 201 and/or controller(s) 204, present a UI interface to a user of IHS 100.

Chipset 202 may further provide access to one or more hard disk and/or solid-state drives 207. In certain embodiments, chipset 202 may also provide access to one or more optical drives or other removable-media drives. In certain embodiments, chipset 202 may also provide access to one or more Universal Serial Bus (USB) ports 208.

Upon booting of IHS 100, processor(s) 201 may utilize Basic Input/Output System (BIOS) 209 instructions to initialize and test hardware components coupled to IHS 100 and to load an Operating System (OS) for use by IHS 100. BIOS 209 provides an abstraction layer that allows the OS to interface with certain hardware components that are utilized by IHS 100. Via the hardware abstraction layer provided by BIOS 209, software stored in memory 203 and executed by the processor(s) 201 of IHS 100 is able to interface with certain I/O devices that are coupled to the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

Chipset 202 may also provide access to one or more user input devices 206, for example, using a super I/O controller or the like. For instance, chipset 202 may provide access to a keyboard (e.g., keyboard 103), mouse, trackpad, stylus, totem, or any other peripheral input device, including touch-screen displays 101 and 102. These input devices may interface with chipset 202 through wired connections (e.g., in the case of touch inputs received via display controller(s) 204) or wireless connections (e.g., via communication interfaces(s) 205). In some cases, chipset 202 may be used to interface with user input devices such as keypads, biometric scanning devices, and voice or optical recognition devices.

In certain embodiments, chipset 202 may also provide an interface for communications with one or more sensors 210. Sensors 210 may be disposed within displays 101/102 and/or hinge 104, and may include, but are not limited to: electric, magnetic, radio, optical, infrared, thermal, force, pressure, acoustic, ultrasonic, proximity, position, deformation, bending, direction, movement, velocity, rotation, and/or acceleration sensor(s).

Figure 3:
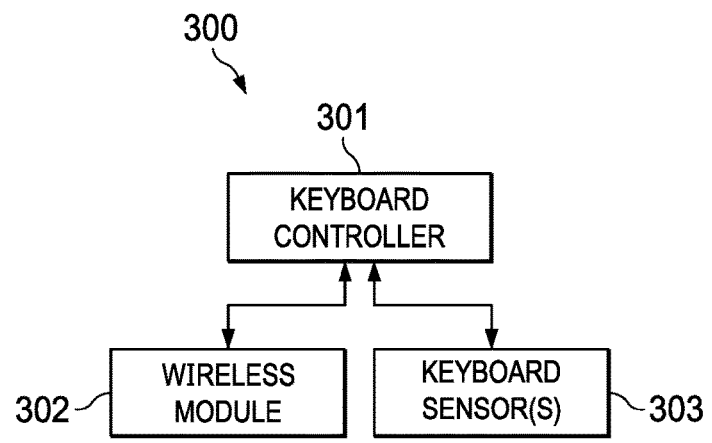

FIG. 3 is a block diagram of components 300 of keyboard IHS 103. As depicted, components 300 include keyboard controller or processor 301, coupled to keyboard sensor(s) 303 and wireless communication module 302. In various embodiments, keyboard controller 301 may be configured to detect keystrokes made by user upon a keyboard matrix, and it may transmit those keystrokes to IHS 100 via wireless module 302 using a suitable protocol (e.g., BLUETOOTH). Keyboard sensors 303, which may also include any of the aforementioned types of sensor(s), may be disposed under keys and/or around the keyboard's enclosure, to provide information regarding the location, arrangement, or status of keyboard 103 to IHS 100 via wireless module 302.

In various embodiments, IHS 100 and/or keyboard 103 may not include all of components 200 and/or 300 shown in FIGS. 2 and 3, respectively. Additionally, or alternatively, IHS 100 and/or keyboard 103 may include components in addition to those shown in FIGS. 2 and 3, respectively. Additionally, or alternatively, components 200 and/or 300, represented as discrete in FIGS. 2 and 3, may be integrated with other components. For example, all or a portion of the functionality provided by components 200 and/or 300 may be provided as a System-On-Chip (SOC), or the like.

Figure 4:
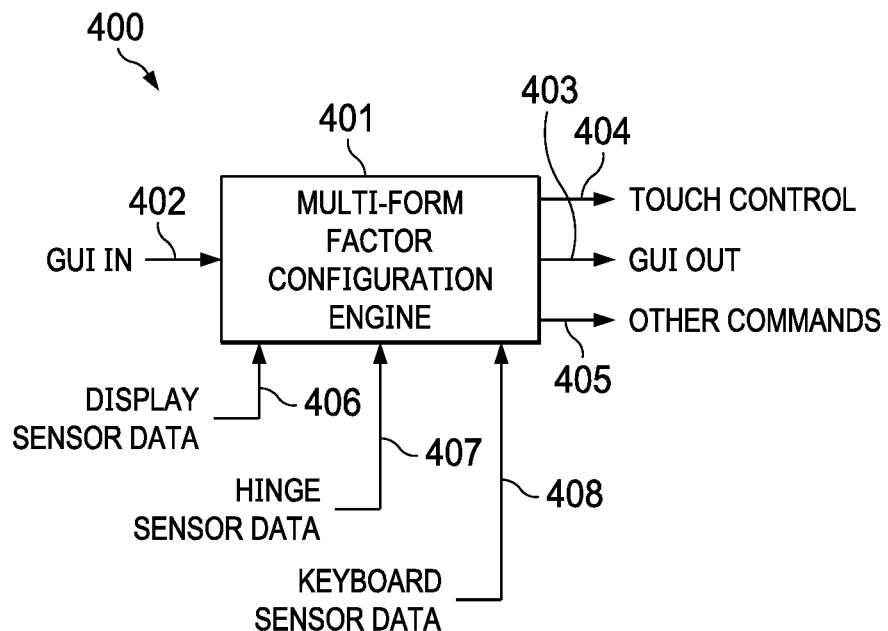
FIG. 4 is a block diagram of a multi-form factor configuration engine, according to some embodiments.

FIG. 4 is a block diagram of multi-form factor configuration engine 401. Particularly, multi-form factor configuration engine 401 may include electronic circuits and/or program instructions that, upon execution, cause IHS 100 to perform a number of operation(s) and/or method(s) described herein.

In various implementations, program instructions for executing multi-form factor configuration engine 401 may be stored in memory 203. For example, engine 401 may include one or more standalone software applications, drivers, libraries, or toolkits, accessible via an Application Programming Interface (API) or the like. Additionally, or alternatively, multi-form factor configuration engine 401 may be included the IHS's OS.

In other embodiments, however, multi-form factor configuration engine 401 may be implemented in firmware and/or executed by a co-processor or dedicated controller, such as a Baseband Management Controller (BMC), or the like.

As illustrated, multi-form factor configuration engine 401 receives Graphical User Interface (GUI) input or feature 402, and produces GUI output or feature 403, in response to receiving and processing one or more or: display sensor data 406, hinge sensor data 407, and/or keyboard sensor data 408. Additionally, or alternatively, multi-form factor configuration engine 401 may produce touch control feature 404 and/or other commands 405.

In various embodiments, GUI input 402 may include one or more images to be rendered on display(s) 101/102, and/or one or more entire or partial video frames. Conversely, GUI output 403 may include one or more modified images (e.g., different size, color, position on the display, etc.) to be rendered on display(s) 101/102, and/or one or more modified entire or partial video frames.

For instance, in response to detecting, via display and/or hinge sensors 406/407, that IHS 100 has assumed a laptop posture from a closed or "off" posture, GUI OUT 403 may allow a full-screen desktop image, received as GUI IN 402, to be displayed first display 101 while second display 102 remains turned off or darkened. Upon receiving keyboard sensor data 408 indicating that keyboard 103 has been positioned over second display 102, GUI OUT 403 may produce a ribbon-type display or area 106 around the edge(s) of keyboard 103, for example, with interactive and/or touch selectable virtual keys, icons, menu options, pallets, etc. If keyboard sensor data 408 then indicates that keyboard 103 has been turned off, for example, GUI OUT 403 may produce an OSK on second display 102.

Additionally, or alternatively, touch control feature 404 may be produced to visually delineate touch input area 107 of second display 102, to enable its operation as a user input device, and to thereby provide an UI interface commensurate with a laptop posture. Touch control feature 404 may turn palm or touch rejection on or off in selected parts of display(s) 101/102. Also, GUI OUT 403 may include a visual outline displayed by second display 102 around touch input area 107, such that palm or touch rejection is applied outside of the outlined area, but the interior of area 107 operates as a virtual trackpad on second display 102.

Multi-form factor configuration engine 401 may also produce other commands 405 in response to changes in display posture and/or keyboard sate or arrangement, such as commands to turn displays 101/102 on or off, enter a selected power mode, charge or monitor a status of an accessory device (e.g., docked in hinge 104), etc.

Figure 5:
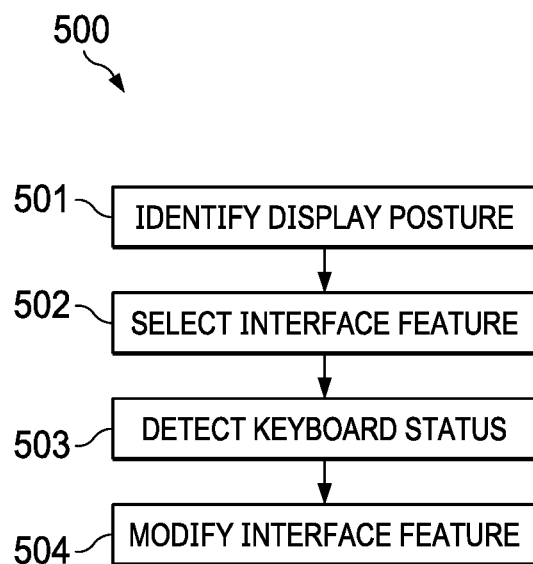
FIG. 5 is a flowchart of a method for configuring multi-form factor IHSs, according to some embodiments.

FIG. 5 is a flowchart of method 500 for configuring multi-form factor IHSs. In various embodiments, method 500 may be performed by multi-form factor configuration engine 401 under execution of processor 201. At block 501, method 500 includes identifying a display posture—that is, a relative physical arrangement between first display 101 and second display 102. For example, block 501 may use sensor data received from displays 101/102 and/or hinge 104 to distinguish among the various postures shown below.

At block 502, method 500 selects a UI feature corresponding to the identified posture. Examples of UI features include, but are not limited to: turning a display on or off; displaying a full or partial screen GUI; displaying a ribbon area; providing a virtual trackpad area; altering touch control or palm rejection settings; adjusting the brightness and contrast of a display; selecting a mode, volume, and/or or directionality of audio reproduction; etc.

At block 503, method 500 may detect the status of keyboard 103. For example, block 503 may determine that keyboard 103 is on or off, resting between two closed displays, horizontally sitting atop display(s) 101/102, or next to display(s) 101/102. Additionally, or alternatively, block 503 may determine the location or position of keyboard 103 relative to display 102, for example, using Cartesian coordinates. Additionally, or alternatively, block 503 may determine an angle between keyboard 103 and displays 101/102 (e.g., a straight angle if display 102 is horizontal, or a right angle if display 102 is vertical).

Then, at block 504, method 500 may modify the UI feature in response to the status of keyboard 103. For instance, block 504 may cause a display to turn on or off, it may change the size or position of a full or partial screen GUI or a ribbon area, it may change the size or location of a trackpad area with changes to control or palm rejection settings, etc. Additionally, or alternatively, block 504 may produce a new interface feature or remove an existing feature, associated with a display posture, in response to any aspect of the keyboard status meeting a selected threshold of falling within a defined range of values.

FIGS. 6A-C, 7A-J, 8A-D, and 9A-F illustrate examples of laptop, tablet, book, and display postures which may be detected by operation of block 501 of method 500 during execution of multi-form factor configuration engine 401 by IHS 100.

Figure 6A:
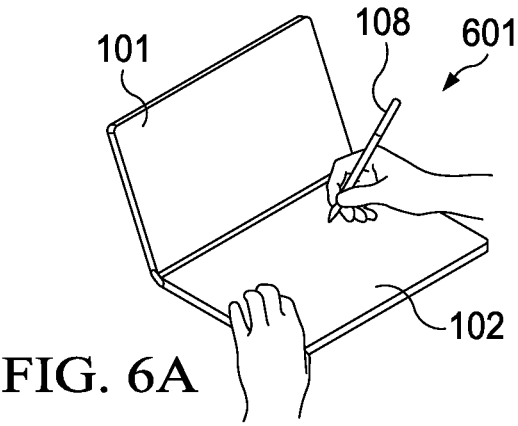
FIGS. 6A-C, 7A-J, 8A-D, and 9A-F illustrate examples of laptop, tablet, book, and display postures, respectively, according to some embodiments.
Figure 6B:
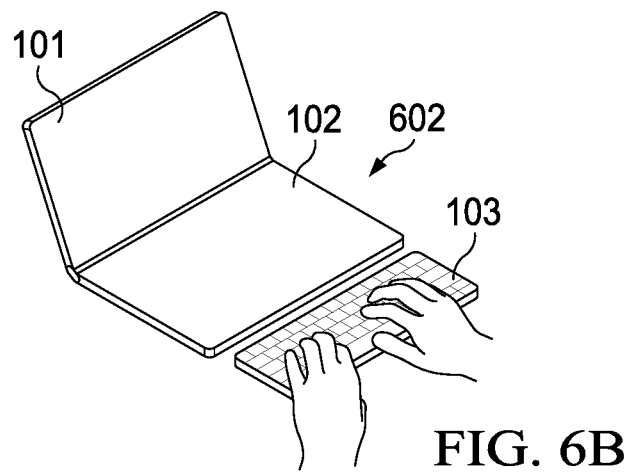
Figure 6C:
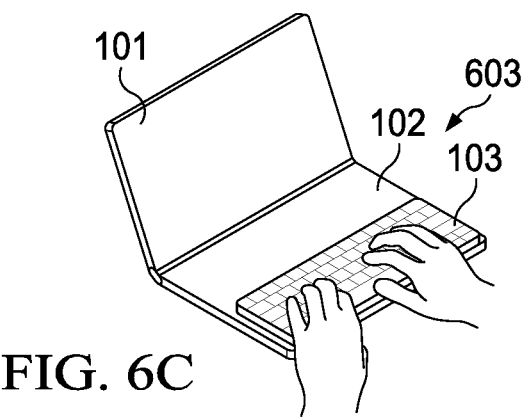

Particularly, FIGS. 6A-C show a laptop posture, where a first display surface of first display 101 is facing the user at an obtuse angle with respect to a second display surface of second display 102, and such that second display 102 is disposed in a horizontal position, with the second display surface facing up. In FIG. 6A, state 601 shows a user operating IHS 100 with a stylus or touch on second display 102. In FIG. 6B, state 602 shows IHS 100 with keyboard 103 positioned off the bottom edge or long side of second display 102, and in FIG. 6C, state 603 shows the user operating keyboard 103 atop second display 102.

Figure 7A:
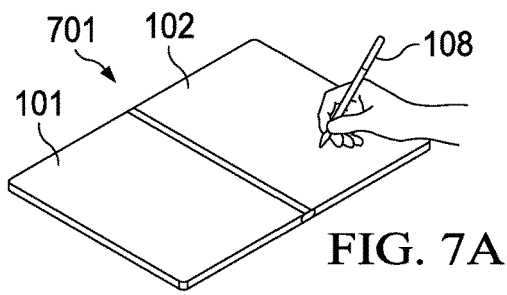
Figure 7B:
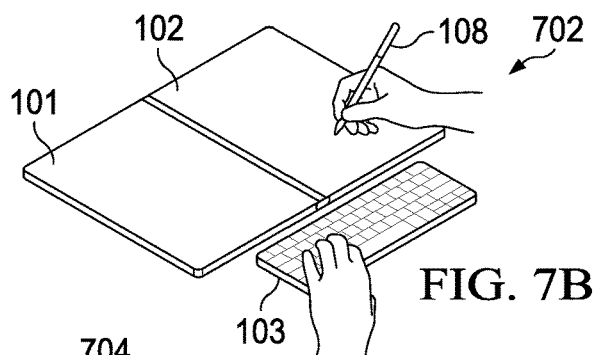
Figure 7C:
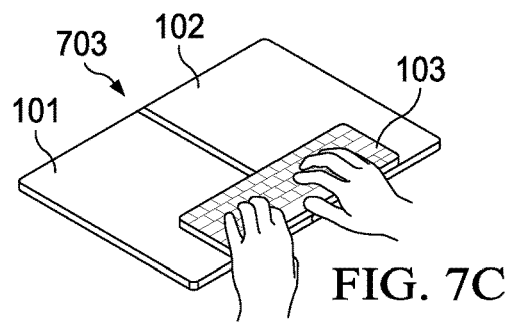
Figure 7D:
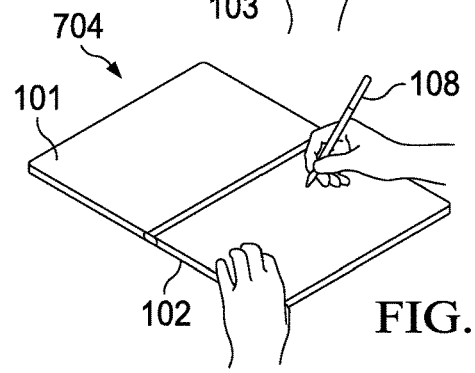
Figure 7E:
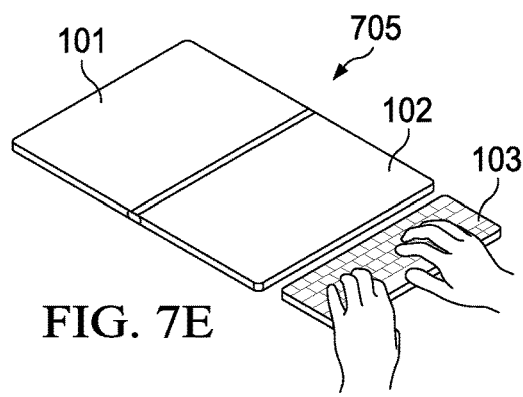
Figure 7F:
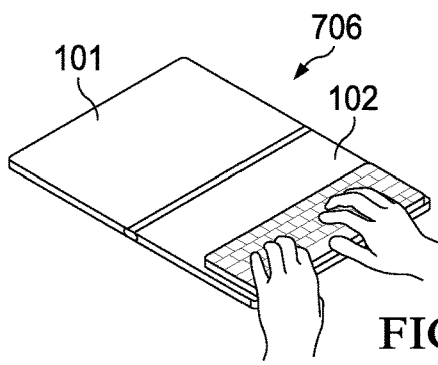

FIGS. 7A-J show a tablet posture, where first display 101 is at a straight angle with respect to second display 102, such that first and second displays 101 and 102 are disposed in a horizontal position, with the first and second display surfaces facing up. Specifically, FIG. 7A shows state 701 where IHS 100 is in a side-by-side, portrait orientation without keyboard 103, FIG. 7B shows state 702 where keyboard 103 is being used off the bottom edges or short sides of display(s) 101/102, and FIG. 7C shows state 703 where keyboard 103 is located over both displays 101 and 102. In FIG. 7D, state 704 shows IHS 100 in a side-by-side, landscape configuration without keyboard 103, in FIG. 7E state 705 shows keyboard 103 being used off the bottom edge or long side of second display 102, and in FIG. 7F state 706 shows keyboard 103 on top of second display 102.

Figure 7G:
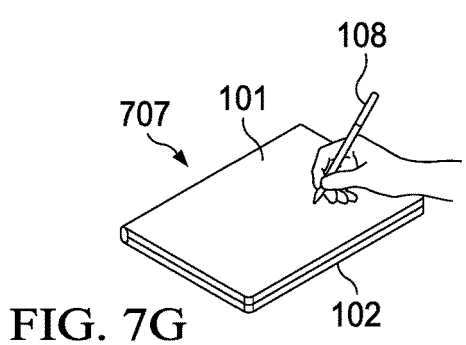
Figure 7H:
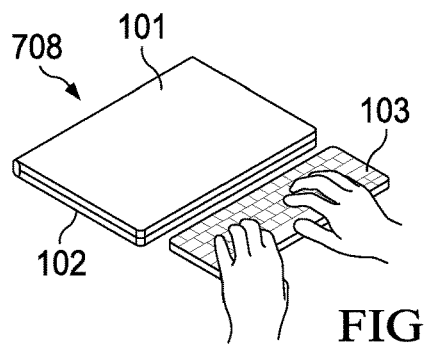
Figure 7I:
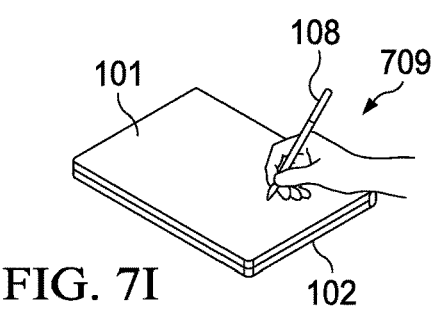
Figure 7J:
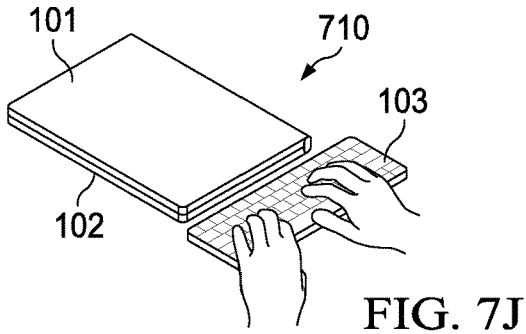

In FIG. 7G, state 707 shows first display 101 rotated around second display 102 via hinge 104 such that the display surface of second display 102 is horizontally facing down, and first display 101 rests back-to-back against second display 102, without keyboard 103; and in FIG. 7H, state 708 shows the same configuration, but with keyboard 103 placed off the bottom or long edge of display 102. In FIGS. 7I and 7J, states 709 and 710 correspond to states 707 and 708, respectively, but with IHS 100 in a portrait orientation.

Figure 8A:
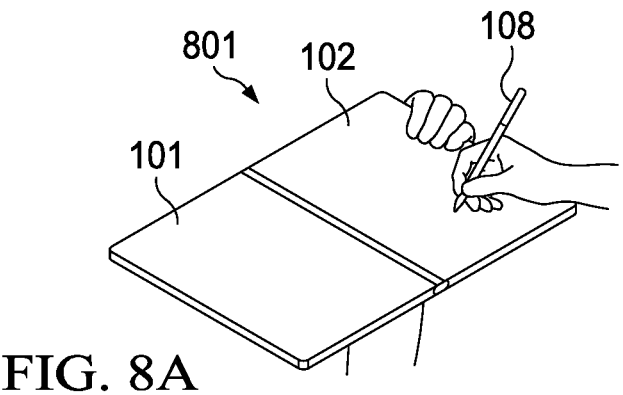
Figure 8B:
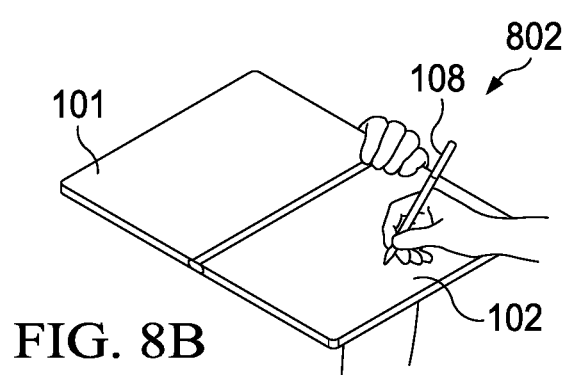
Figure 8C:
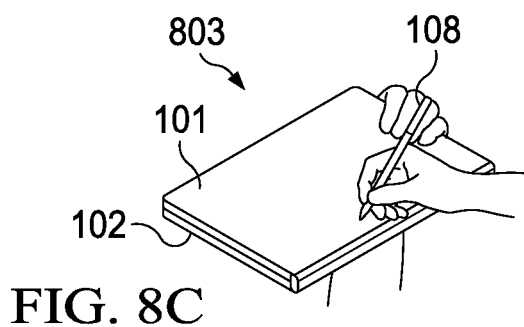
Figure 8D:
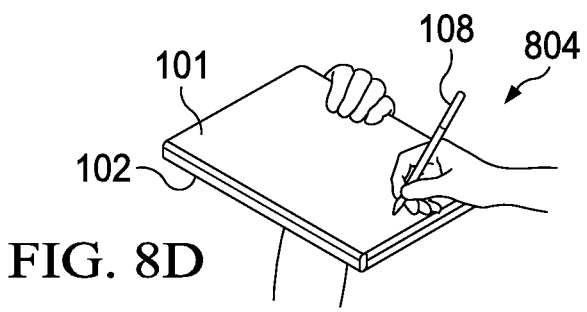

FIG. 8A-D show a book posture, similar to the tablet posture of FIGS. 7A-J, but such that neither one of displays 101 or 102 is horizontally held by the user and/or such that the angle between the display surfaces of the first and second displays 101 and 102 is other than a straight angle. In FIG. 8A, state 801 shows dual-screen use in portrait orientation, in FIG. 8B state 802 shows dual-screen use in landscape orientation, in FIG. 8C state 803 shows single-screen use in landscape orientation, and in FIG. 8D state 804 shows single-screen use in portrait orientation.

Figure 9A:
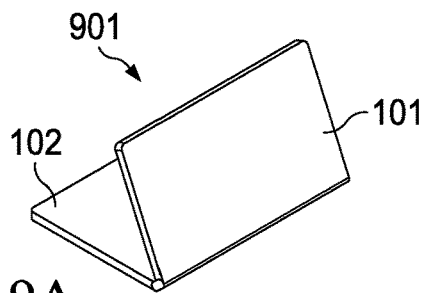
Figure 9B:
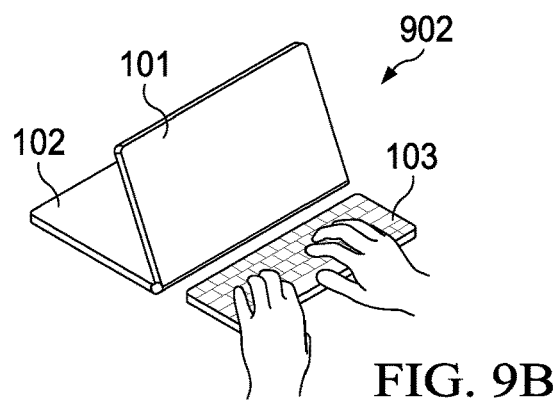
Figure 9C:
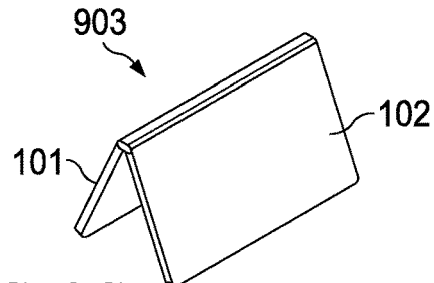
Figure 9D:
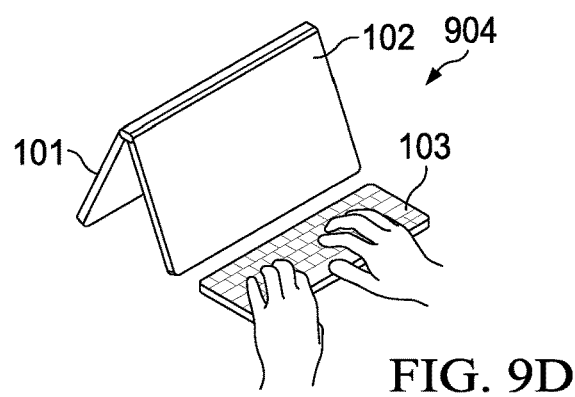
Figure 9E:
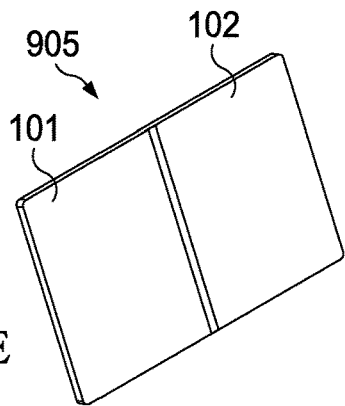
Figure 9F:
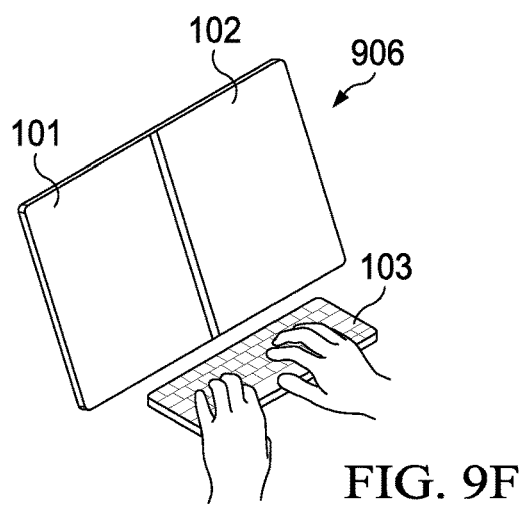
Figure 13E:
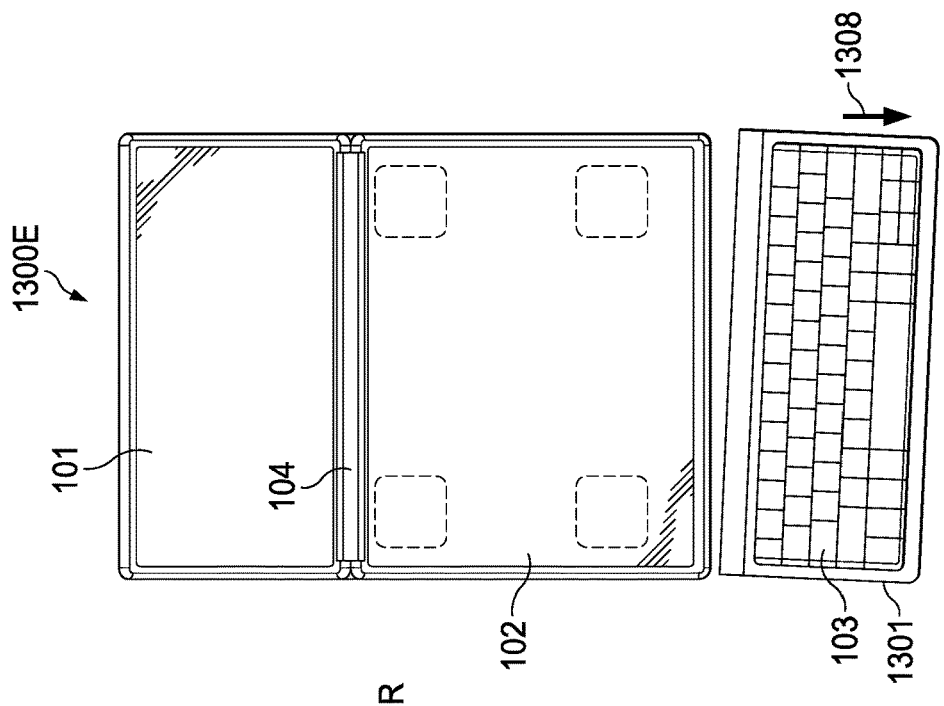
Figure 13D:
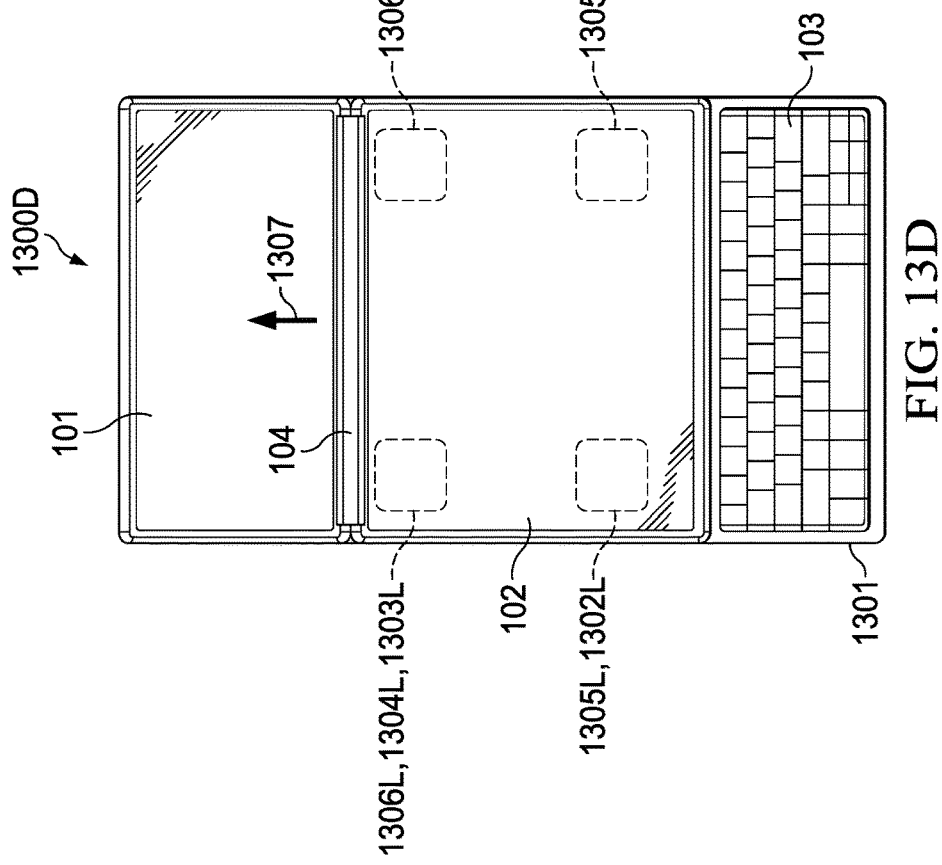

FIGS. 9A-F show a display posture, where first display 100 is at an acute angle with respect to second display 102, and/or where both displays are vertically arranged in a portrait orientation. Particularly, in FIG. 9A state 901 shows a first display surface of first display 102 facing the user and the second display surface of second display 102 horizontally facing down, whereas in FIG. 9B state 902 shows the same configuration but with keyboard 103 used off the bottom edge or long side of display 101. In FIG. 9C, state 903 shows a display posture where display 102 props up display 101 in a stand configuration, and in FIG. 9D, state 904 shows the same configuration but with keyboard 103 used off the bottom edge or long side of display 101. In FIG. 9E, state 905 shows both displays 101 and 102 resting vertically or at display angle, and in FIG. 9F state 906 shows the same configuration but with keyboard 103 used off the bottom edge or long side of display 101.

It should be noted that the aforementioned postures, and their various respective keyboard states, are described for sake of illustration. In different embodiments, however, other postures and keyboard states may be used, for example, depending upon the type of hinge coupling the displays, the number of displays used, or other accessories. For instance, when IHS 100 is chargeable via a charging or docking station, the connector in the docking station may be configured to hold IHS 100 at angle selected to facility one of the foregoing postures (e.g., keyboard states 905 and 906).

FIGS. 10A-C illustrate a first example use-case of method 500 in the context of a laptop posture. In state 1000A of FIG. 10A, first display 101 shows primary display area 1001, keyboard 103 sits atop second display 102, and second display 102 provides UI features such as first ribbon area 1002 (positioned between the top long edge of keyboard 103 and hinge 104) and touch area 1003 (positioned below keyboard 103). As keyboard 103 moves up or down on the surface of display 102, ribbon area 1002 and/or touch area 1003 may dynamically move up or down, or become bigger or smaller, on second display 102. In some cases, when keyboard 103 is removed, a virtual OSK may be rendered (e.g., at that same location) on the display surface of display 102.

In state 1000B of FIG. 10B, in response to execution of method 500 by multi-form factor configuration engine 401, first display 101 continues to show main display area 1001, but keyboard 103 has been moved off of display 102. In response, second display 102 now shows secondary display area 1004 and also second ribbon area 1005. In some cases, second ribbon area 1005 may include the same UI features (e.g., icons, etc.) as also shown in area 1002, but here repositioned to a different location of display 102 nearest the long edge of keyboard 103. Alternatively, the content of second ribbon area 1005 may be different from the content of first ribbon area 1002.

In state 1000C of FIG. 100, during execution of method 500 by multi-form factor configuration engine 401, IHS 100 detects that physical keyboard 103 has been removed (e.g., out of wireless range) or turned off (e.g., low battery), and in response display 102 produces a different secondary display area 1006 (e.g., smaller than 1004), as well as OSK 1007.

FIGS. 11A-C illustrate a second example use-case of method 500 in the context of a tablet posture. In state 1100A of FIG. 11A, second display 102 has its display surface facing up, and is disposed back-to-back with respect to second display 102, as in states 709/710, but with keyboard 103 sitting atop second display 102. In this state, display 102 provides UI features such primary display area 1101 and first ribbon area 1102, positioned as shown. As keyboard 103 is repositioned up or down on the surface of display 102, display area 1101, first ribbon area 1102, and/or touch area 1103 may also be moved up or down, or made bigger or smaller, by multi-form factor configuration engine 401.

In state 1100B of FIG. 11B, keyboard 103 is detected off of the surface of display 102. In response, first display 101 shows modified main display area 1103 and modified ribbon area 1104. In some cases, modified ribbon area 1104 may include the same UI features as area 1102, but here repositioned to a different location of display 102 nearest the long edge of keyboard 103. Alternatively, the content of second ribbon area 1104 may be different from the content of first ribbon area 1102. In some cases, the content and size of modified ribbon area 1104 may be selected in response to a distance between keyboard 103 and display 102.

In state 1100C of FIG. 11C, during continued execution of method 500, multi-form factor configuration engine 401 detects that physical keyboard 103 has been removed or turned off, and in response display 102 produces yet another display area 1105 (e.g., larger than 1003 or 1002), this time without an OSK.

In various embodiments, the different UI behaviors discussed in the aforementioned use-cases may be set, at least in part, by policy and/or profile, and stored in a preferences database for each user. In this manner, UI features and modifications of blocks 502 and 504, such as whether touch input area 1003 is produced in state 1000A (and/or its size and position on displays 101/102), or such as whether ribbon area 1102 is produced in state 1100A (and/or its size and position on displays 101/102), may be configurable by a user.

FIGS. 12A-D illustrate a 360-hinge implementation, usable as hinge 104 in IHS 100, in four different configurations 1200A-D, respectively. Particularly, 360-hinge 104 may include a plastic, acrylic, polyamide, polycarbonate, elastic, and/or rubber coupling, with one or more internal support, spring, and/or friction mechanisms that enable a user to rotate displays 101 and 102 relative to one another, around the axis of 360-hinge 104.

Hinge configuration 1200A of FIG. 12A may be referred to as a closed posture, where at least a portion of a first display surface of the first display 101 is disposed against at least a portion of a second display surface of the second display 102, such that the space between displays 101/102 accommodates keyboard 103. When display 101 is against display 102, stylus or accessory 108 may be slotted into keyboard 103. In some cases, stylus 108 may have a diameter larger than the height of keyboard 103, so that 360-hinge 104 wraps around a portion of the circumference of stylus 108 and therefore holds keyboard 103 in place between displays 101/102.

Hinge configuration 1200B of FIG. 12B shows a laptop posture between displays 101/102. In this case, 360-hinge 104 holds first display 101 up, at an obtuse angle with respect to first display 101. Meanwhile, hinge configuration 1200C of FIG. 12C shows a tablet, book, or display posture (depending upon the resting angle and/or movement of IHS 100), with 360-hinge 104 holding first and second displays 101/102 at a straight angle (180°) with respect to each other. And hinge configuration 1200D of FIG. 12D shows a tablet or book configuration, with 360-hinge 104 holding first and second displays 101 and 102 at a 360° angle, with their display surfaces in facing opposite directions.

FIGS. 13A-E illustrate a folio system with a detachable keyboard in various configurations. In some embodiments, the folio system may be configured to wrap around the exterior side of IHS 100, covering the exterior chassis (or non-display) portion of first and second displays 101 and 102.

A folio system may include a set of hard foldable panels, sections, or flaps wrapped in fabric or plastic, with magnetic elements that facilitate keeping panels in a desired configuration. One or more panels may include a keyboard, which may be detachable from the folio case for use with the IHS (e.g., placed over display 102 to produce a ribbon area). In some cases, the presence and/or state of the folio case may be detectable via sensors 303.

In configuration 1300A, a folio case includes first panel 1304 having left-side magnet 1304L and right-side magnet 1304R, second panel 1303, having left-side magnet 1303L and right-side magnet 1303R, and first panel 1302 having left-side magnet 1302L and right-side magnet 1302R. A bottom edge of first panel 1304 is coupled to a top edge of second panel 1303, and a bottom edge of second panel 1303 is coupled to a top edge of third panel 1302. Moreover, a bottom edge of third panel 1302 is coupled a top edge of keyboard 1301.

In configuration 1300B, first panel 1304 is folded over second panel 1303, such that left-side magnet 1304L of first panel 1304 is magnetically coupled to left-side magnet 1303L of second panel 1303, and right-side magnet 1304R of first panel 1304 is magnetically coupled to right-side magnet 1303R of second panel 1303.

In some cases, third panel 1302 and keyboard 1301 may each have a thickness that matches the thickness resulting from the folding of first panel 1304 over second panel 1303, so that configuration 1300B provides a flat surface that IHS 100 can slide over. As the IHS slides, it may be guided by a magnetic rail formed by magnets 1302L-1304L and 1302R-1304R. In some cases, magnets 1302L-1304L and 1302R-1304R may have their polarities selected to form such a magnetic rail.

Configuration 1300C shows IHS 100 in a laptop posture, with secondary display 102 resting over keyboard 1301 and third panel 1302. In various implementations, display 102 may include a set of four guiding magnets 1305L/R and 1306L/R. Particularly, display magnets 1305L/R sit on top of keyboard 1301 used, whereas display magnet 1306L is magnetically coupled to magnet 1302L in third panel 1302, and display magnet 1306R is magnetically coupled to magnet 1302R in third panel 1302.

The space between the top edge of third panel 1302 and the bottom edge of second panel 1303 may be larger than a space between the top edge of second panel 1303 and the bottom edge of first panel 1304, such that the former can accommodate the opening and closing of hinge 104 during use of the IHS. In a configuration similar to 1300A, first and second panels 1304 and 1303 may used to protect the exterior of display 101, while third panel 1302 and (the back part of) keyboard 1301 may be used to protect the exterior of display 102.

In configuration 1300D, first panel 1304 is folded over second panel 1302 to form a horizontal stack, as in 1300B. Display 102 slides in direction 1307 when IHS 100 pushed backwards by a user, in the laptop or clamshell posture, to reveal keyboard 1301. In this state, display magnet 1305L is magnetically coupled to magnet 1302L of third panel 1302, display magnet 1305R is magnetically coupled to magnet 1302R of third panel 1302, display magnet 1306L is magnetically coupled to magnet 1304L of first panel 1304 and magnet 1303L of second panel 1303, and display magnet 1306R is magnetically coupled to magnet 1304R of first panel 1304 and magnet 1303R of second panel 1303.

In configuration 1300E, display 102 stays in place while keyboard 1301 is torn off and pull apart from the rest in of the folio system, in direction 1308.

Figure 14A:
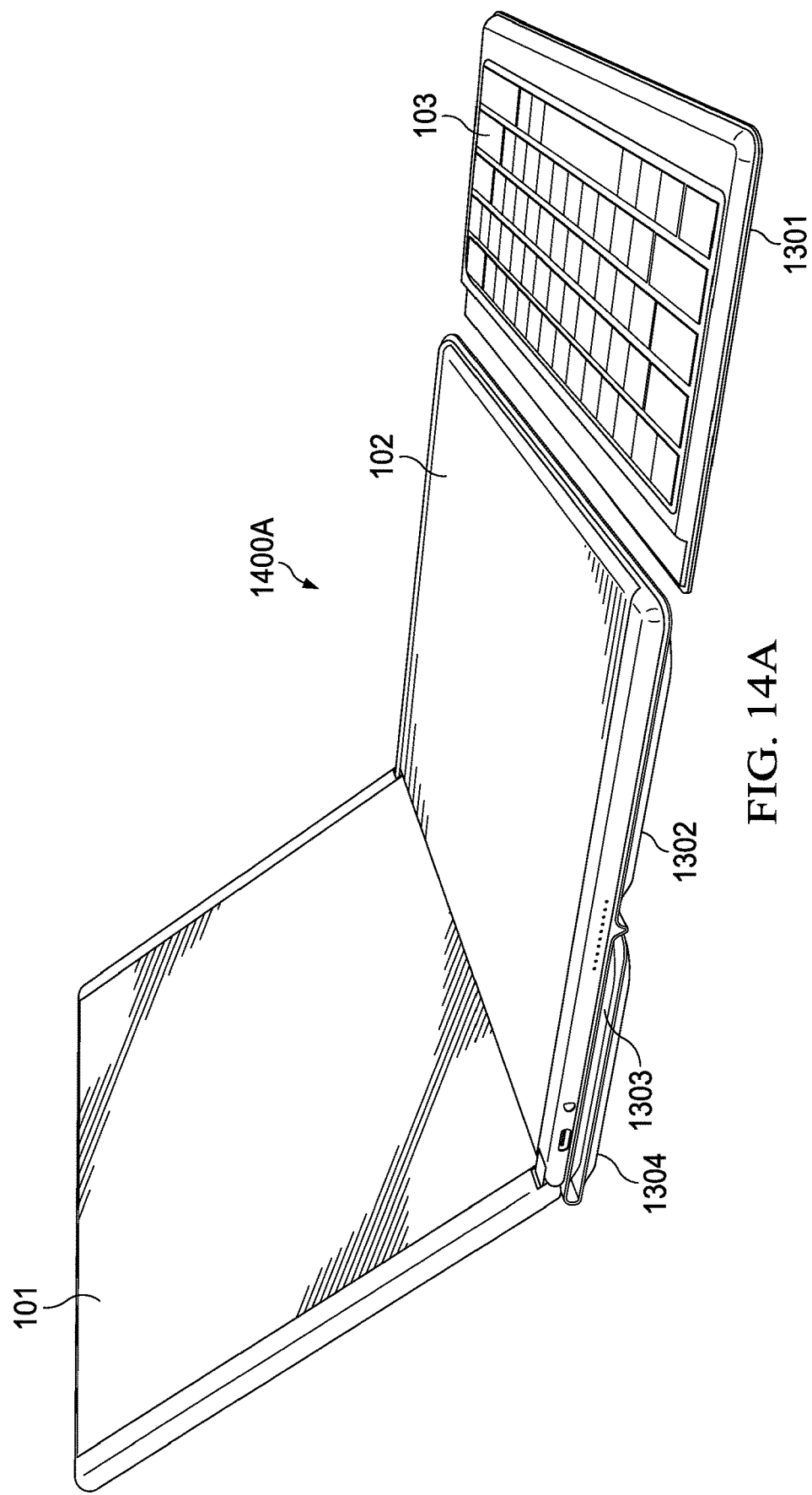
FIGS. 14A and 14B illustrate a multi-form factor IHS being used with in the folio system, according to some embodiments.
Figure 14B:
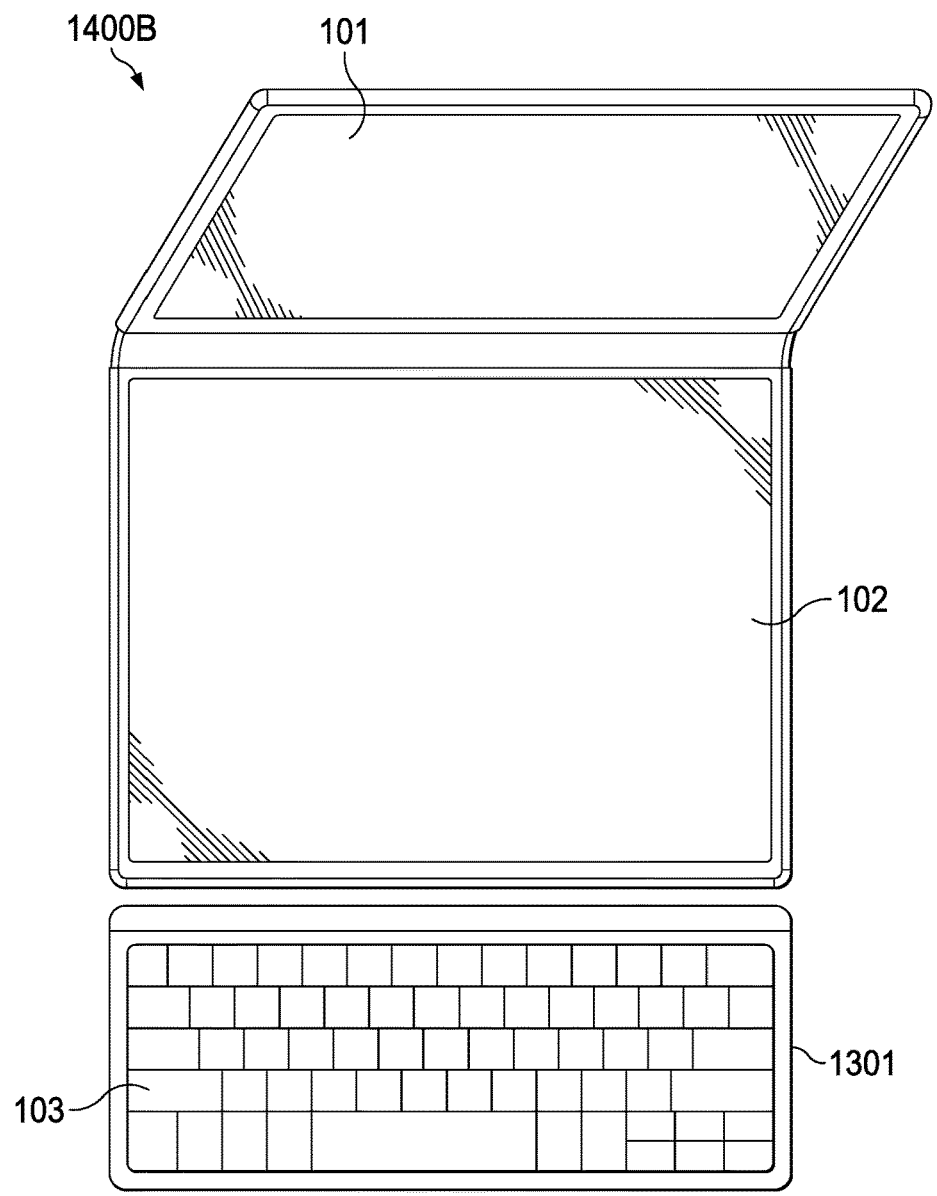

FIGS. 14A and 14B illustrate multi-form factor IHS 100 used with the folio system. Specifically, side view 1400A shows a first portion of display 102 resting on top first panel 1304 (folded over second panel 1303), and a second portion of display 102 resting on top of third panel 1302. In this case, keyboard 1301 is detached from third panel 1302. Top view 1400B shows the same configuration from a different visual perspective. As shown in top view 1400B, keyboard 1301 may be moved anywhere on the horizontal surface and/or moved to the top of display 102 to produce ribbon or touch areas.

Figure 15:
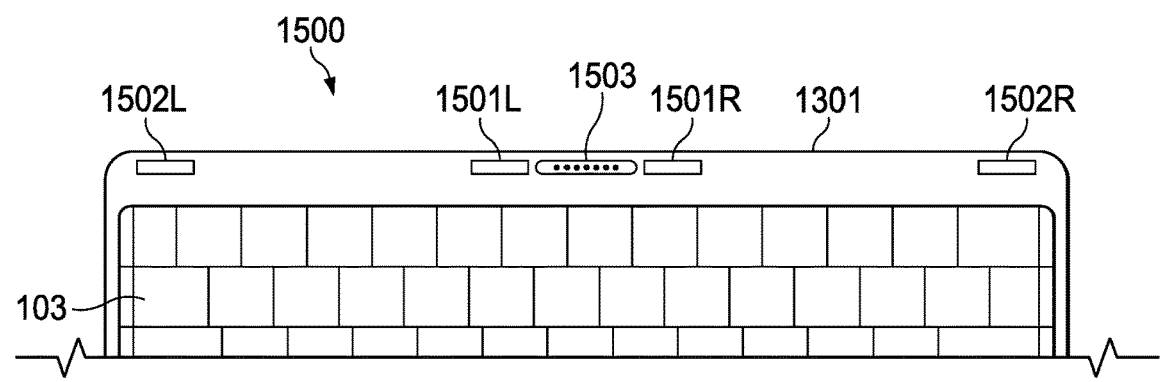
FIG. 15 illustrates a detachable keyboard, according to some embodiments.
Figure 16A:
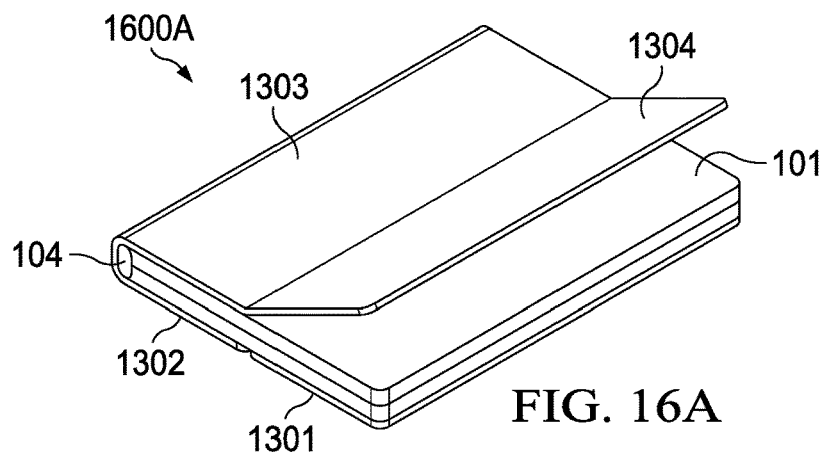
FIGS. 16A-H illustrate a method for operating a folio system with a detachable keyboard, according to some embodiments.
Figure 16B:
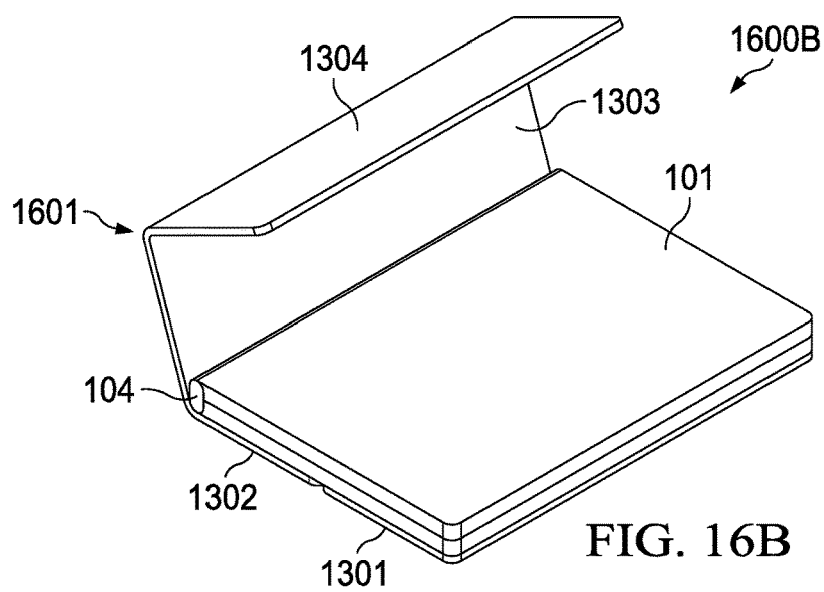
Figure 16C:
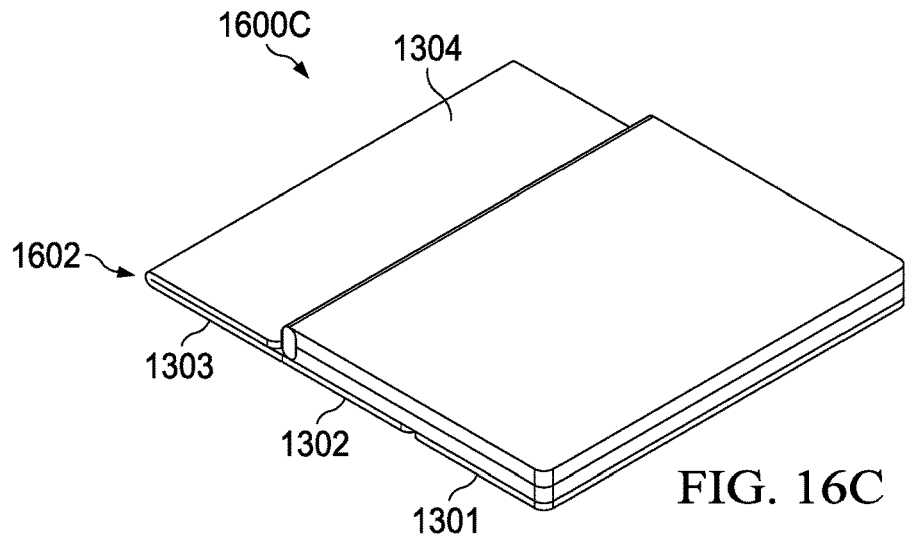
Figure 16D:
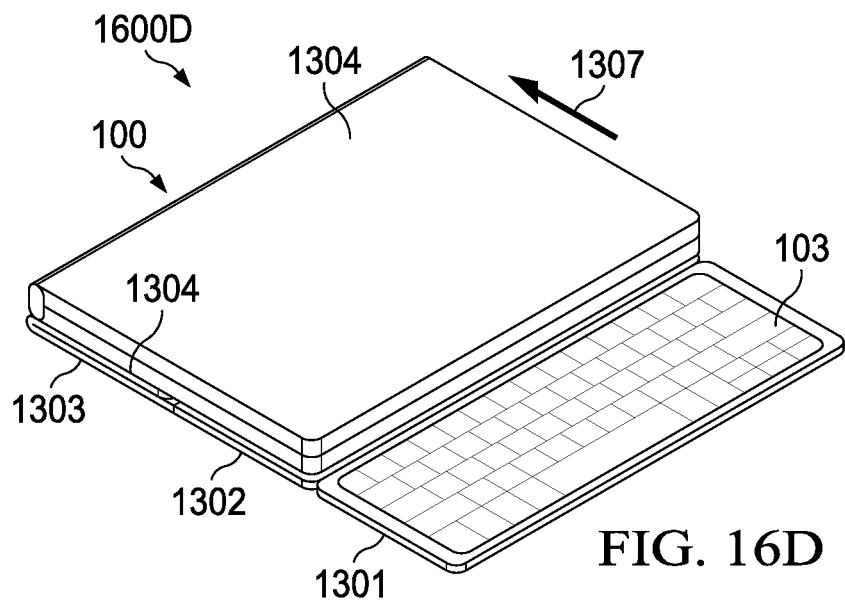
Figure 16E:
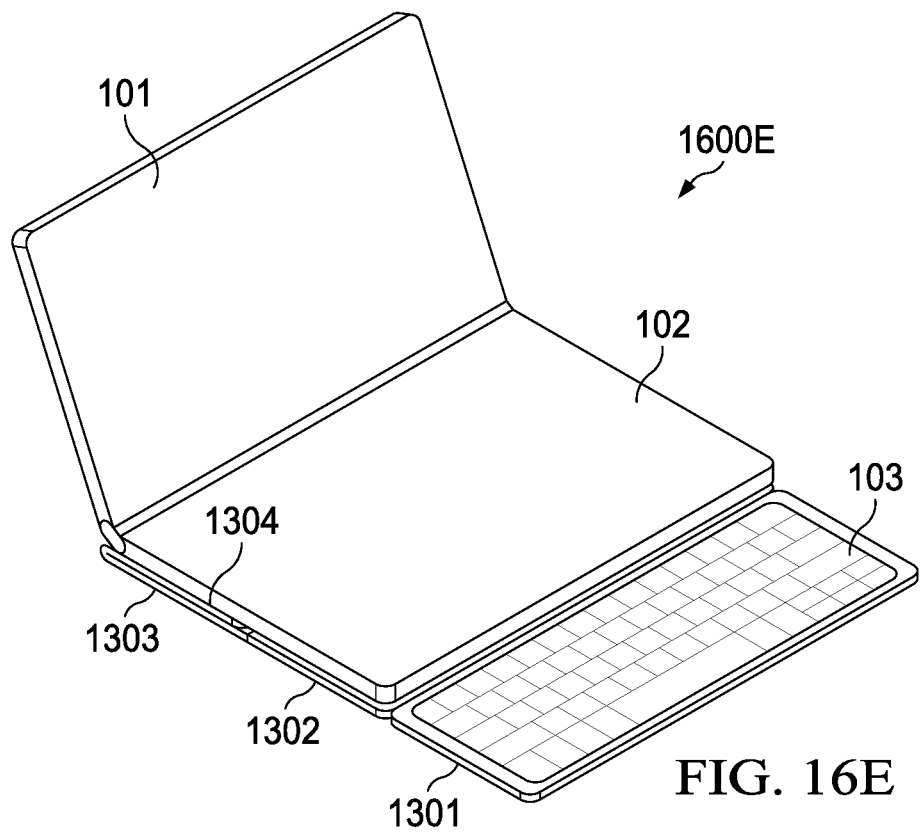
Figure 16F:
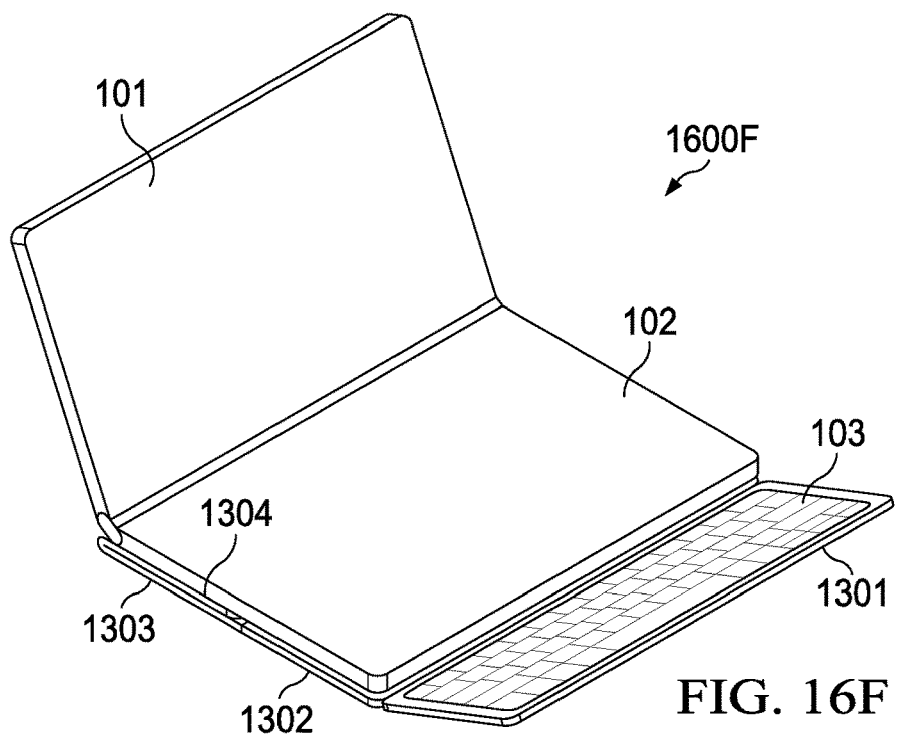
Figure 16G:
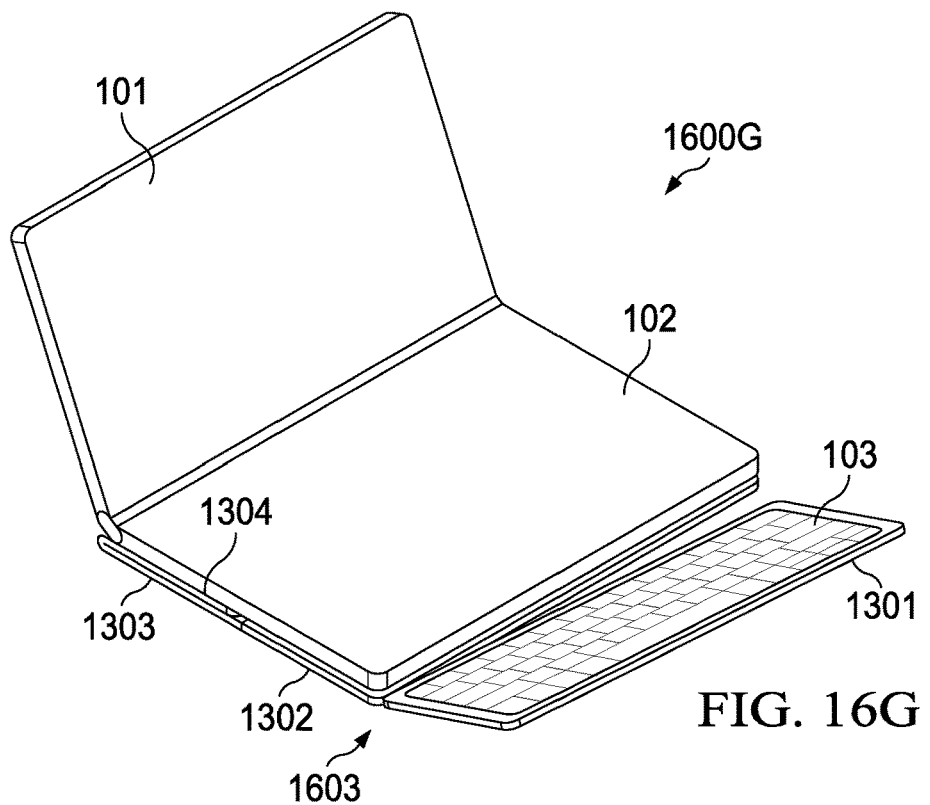
Figure 16H:
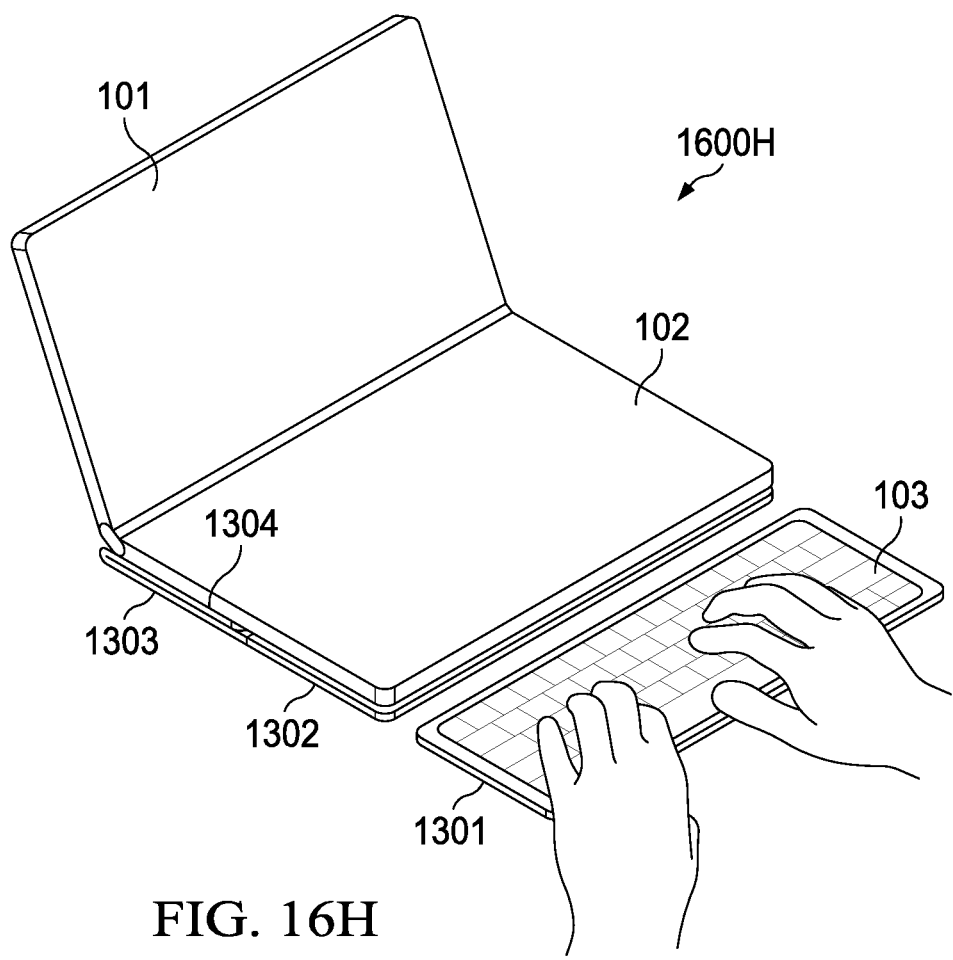

FIG. 15 illustrates detachable keyboard 1301. As shown in top view 1500, keyboard 1301 may include an electrical connector or terminal 1503, as well as a plurality of magnets 1501L/R and 1502L/R disposed alongside the top edge of keyboard 1301. Electrical connector or terminal 1503 may be used to charge a battery within keyboard 1301 and/or communicate with controllers and/or sensors disposed in keyboard 1301 and/or in the folio case. For example, a keyboard sensor may indicate, through connector 1502, that keyboard 1301 is coupled the folio case, such that a ribbon area may be produced in response on display 102, alongside the top edge of the keyboard.

In some cases, the top edge of keyboard 1301 may be thinner than its keycap portion to create a lip that slides under the bottom edge of third panel 1302. Accordingly, magnets 1501L/R and 1502L/R are usable to couple keyboard 1301 to third panel 1302 and/or directly to the underside of display 102.

FIGS. 16A-H illustrate a method for operating a folio system with a detachable keyboard. In position 1600A, a user picks up first panel 1304 apart from display 101. In position 1600B, the user pushes first panel 1304 backwards, so that the bottom edge of first panel 1304 and the top edge of second panel 1303 extend 1601 farthest from hinge 104, and until the two panels form stack 1602, as shown in position 1600C.

In position 1600D, the user slides IHS 100 (here in a clamshell posture with displays 101/102 closed) backwards using the interactions between magnets in display 102 and in the folio system as magnetic rails, until display 102 snaps in place or otherwise stops between third panel 1302 and second panel 1303, hence revealing keyboard 1301.

In position 1600F, the user lifts the bottom edge of keyboard 1301 from the table while the top edge of the keyboard is still magnetically coupled to the bottom edge of third panel 1302. In position 1600G, the user pulls corner 1603 of keyboard 1301 away from the bottom edge of third panel 1302 (and the other corner is pulled next). In other cases, the entire top edge of the keyboard may be pulled away at once. Finally, position 1600H shows keyboard 1301 sitting away from display 102, on the same horizontal surface.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A folio case, comprising:
   a first panel comprising a left-side magnet and a right-side magnet;
   a second panel comprising a left-side magnet and a right-side magnet, wherein a top edge of the second panel is coupled to a bottom edge of the first panel; and
   a third panel comprising a left-side magnet and a right-side magnet, wherein a top edge of the third panel is coupled to a bottom edge of the second panel, wherein the third panel is configured to receive a keyboard usable with an Information Handling System, and wherein a top edge of the keyboard includes one or more magnets configured to couple the keyboard to a bottom edge of the third panel, and to mate an electrical terminal of the keyboard against an electrical terminal of the third panel.

2. The folio case of claim 1, wherein in response to the first panel being folded over the second panel, the left-side magnet of the first panel is magnetically coupled to the left-side magnet of the second panel, and the right-side magnet of the first panel is magnetically coupled to the right-side magnet of the second panel.

3. The folio case of claim 2, wherein the third panel has a thickness equal to the thickness of the first and second panels folded over each other.

4. The folio case of claim 1, wherein a space between the top edge of the third panel and the bottom edge of the second panel is larger than a space between the top edge of the second panel and the bottom edge of the first panel.

5. The folio case of claim 4, wherein the space between the bottom edge of the second panel and the top edge of the third panel accommodates a hinge of the IHS.

6. The folio case of claim 1, wherein in a first configuration, the first panel is folded over the second panel to form a panel stack, wherein the keyboard is coupled to the third panel, and a display of the IHS sits on top of the third panel and the keyboard.

7. The folio case of claim 6, wherein in a second configuration, the display of the IHS slides over the panel stack and the third panel to reveal the keyboard.

8. A method, comprising:
   folding a first panel of a folio case over a second panel of the folio case to form a stack; and
   sliding an Information Handling System (IHS) from (i) a first position where a first portion of a display rests over a third panel of the folio case and a second portion of the display rests over the entirety of a keyboard coupled to the third panel to (ii) a second position where the first portion of the display rests over the stack and the second portion of the display rests on the third panel.

9. The method of claim 8, further comprising tearing the keyboard off from the third panel while the IHS is in the second position.

10. The method of claim 9, further comprising coupling a top edge of the keyboard to a bottom edge of the third panel while the IHS is in the second position.

11. The method of claim 10, further comprising:
    sliding the IHS from the second position to the first position; and
    unfolding the first panel from the second panel to cover another display of the IHS, wherein the other display is coupled to the display via a hinge.

\* \* \* \* \*